(12) United States Patent
Tabata et al.

(10) Patent No.: US 12,157,364 B2
(45) Date of Patent: Dec. 3, 2024

(54) DRIVING APPARATUS FOR VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Koji Takaira, Okazaki (JP); Tatsuya Imamura, Okazaki (JP); Yohei Habata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 394 days.

(21) Appl. No.: 17/807,008

(22) Filed: Jun. 15, 2022

(65) Prior Publication Data
US 2022/0402358 A1 Dec. 22, 2022

(30) Foreign Application Priority Data

Jun. 17, 2021 (JP) .................................. 2021-101135

(51) Int. Cl.
*B60K 17/14* (2006.01)
*B60K 17/10* (2006.01)

(52) U.S. Cl.
CPC .............. *B60K 17/14* (2013.01); *B60K 17/10* (2013.01)

(58) Field of Classification Search
CPC .................................. B60K 17/14; B60K 17/10
See application file for complete search history.

(56) References Cited

U.S. PATENT DOCUMENTS

| | | | |
|---|---|---|---|
| 2014/0180441 A1* | 6/2014 | Hiasa ..................... | B60W 10/06 700/22 |
| 2015/0210270 A1* | 7/2015 | Pietron ................. | B60W 20/13 180/65.265 |
| 2019/0135103 A1 | 5/2019 | Kuze et al. | |
| 2019/0359050 A1* | 11/2019 | Komuro ................. | B60L 50/16 |

FOREIGN PATENT DOCUMENTS

| | | |
|---|---|---|
| JP | 2007-246056 A | 9/2007 |
| JP | 2019-85001 A | 6/2019 |

* cited by examiner

*Primary Examiner* — Bryan A Evans
(74) *Attorney, Agent, or Firm* — Oblon, McClelland, Maier & Neustadt, L.L.P.

(57) ABSTRACT

A driving apparatus includes: a first power source; a fluid transmission device; a first output shaft for receiving a power transmitted from the fluid transmission device through a first power transmission path and outputting the power to drive wheels of a vehicle; a rotary electric machine connected to the first output shaft and/or the drive wheels, through a second power transmission path; and a control device. When the vehicle is stopped or running at an extremely low speed, with a rotary-electric-machine driving mode being established, the control device is configured, upon determination that a drive request amount is larger than a threshold amount value, to place a direct clutch of the fluid transmission device into an engaged state and to place the first power transmission path into a power transmittable state so as to cause the power of the first power source to be outputted to the first output shaft.

8 Claims, 13 Drawing Sheets

FIG.3

| AT GEAR POSITION | C1 | C2 | B1 | B2 | F1 |
|---|---|---|---|---|---|
| N, Rev | | | | | |
| 1st | ○ | | | △ | ○ |
| 2nd | ○ | | ○ | | |
| 3rd | ○ | ○ | | | |
| 4th | | ○ | ○ | | |

FIG.6

| NUMBER | MODE | BF1 | CF1 | D1 STATE | | D2 STATE | | |
|---|---|---|---|---|---|---|---|---|
| | | | | [1] | [2] | [1] | [2] | [3] |
| | | | | CONNECTION | | CONNECTION | | |
| | | | | a1-a2 | a1-a3 | N | a4-a6 | a5-a6 |
| m1 | EV (FF) HIGH | | O | (O) | | O | | |
| m2 | EV (FF) LOW | O | | (O) | | O | | |
| m3 | H4_TORQUE SPLIT | | | O | | | O | |
| m4 | H4_LSD | | O CONTROL | O | | | O | |
| m5 | H4_Lock | | | O | | | | O |
| m6 | L4_Lock | O | | | O | | | O |

FIG.12

| NUMBER | MODE | BF1 | CF1 | D1 STATE | | D2 STATE | | |
|---|---|---|---|---|---|---|---|---|
| | | | | [1] CONNECTION | [2] CONNECTION | [1] | [2] | [3] |
| | | | | a1-a2 | a1-a3 | N | a4-a6 | a5-a6 |
| m1 | EV (FR) HIGH | | ○ | (○) | | ○ | | |
| m2 | EV (FR) LOW | ○ | | (○) | | ○ | | |
| m3 | H4_TORQUE SPLIT | | | ○ | | | ○ | |
| m4 | H4_LSD | | ○ CONTROL | ○ | | | ○ | |
| m5 | H4_Lock | | | ○ | | | | ○ |
| m6 | L4_Lock | ○ | | | ○ | | | ○ |

DRIVING APPARATUS FOR VEHICLE

This application claims priority from Japanese Patent Application No. 2021-101135 filed on Jun. 17, 2021, the disclosure of which is herein incorporated by reference in its entirety.

FIELD OF THE INVENTION

The present invention relates to a driving apparatus for a vehicle, wherein the driving apparatus includes a rotary electric machine that is connected, in a power transmittable manner, to drive wheels through a power transmission path that is other than a power transmission path through which a power is to be transmitted via a fluid transmission device.

BACKGROUND OF THE INVENTION

There is known a driving apparatus for a vehicle, comprising: (a) a first power source; (b) a fluid transmission device including (b-1) an input-side rotary element connected to the first power source in a power transmittable manner, (b-2) an output-side rotary element connected to a pair of first wheels and a pair of rear wheels in a power transmittable manner, and (b-3) a direct clutch configured to connect and disconnect between the input-side rotary element and the output-side rotary element, and configured to transmit a power of the first power source from the input-side rotary element to the output-side rotary element through a fluid; (c) a first output shaft which is configured to receive the power transmitted from the output-side rotary element through a first power transmission path and which is configured to output the power to one of the pair of front wheels and the pair of rear wheels; (d) a rotary electric machine connected, in a power transmittable manner, to the first output shaft and/or the other of the pair of front wheels and the pair of rear wheels, through a second power transmission path that is other than the first power transmission path; and (e) a control device. An example of such a driving apparatus is disclosed in JP 2007-246056 A. This Japanese Patent Application Publication discloses a control device capable of establishing, as a driving mode for driving the vehicle, a rotary-electric-machine driving mode in which the rotary electric machine is used as a second power source with operation of the above-described first power source being stopped.

SUMMARY OF THE INVENTION

By the way, a large drive torque is required for the vehicle, for example, when the vehicle is on an uphill road or when riding on a step. In a case in which the large drive torque is required for the vehicle when the vehicle is stopped or is running at an extremely low speed with the rotary-electric-machine driving mode being established as the driving mode, the rotary electric machine is stopped or is rotated at an extremely low speed so as to be placed in a so-called single-phase lock state, namely, a state in which an electric current continues flowing through the rotary electric machine that is in a certain phase, so that electric equipment such as the rotary electric machine and an inverter could be problematically overheated as a result of flow of the large electric current through the rotary electric machine.

The present invention was made in view of the background art described above. It is therefore an object of the present invention to provide a driving apparatus for a vehicle, which is capable of suppressing overheating of equipment such as a rotary electric machine in a rotary-electric-machine driving mode.

The object indicated above is achieved according to the following aspects of the present invention.

According to a first aspect of the invention, there is provided a driving apparatus for a vehicle includes a pair of front wheels and a pair of rear wheels, the driving apparatus comprising: (a) a first power source; (b) a fluid transmission device including an input-side rotary element connected to the first power source in a power transmittable manner, an output-side rotary element connected to the pair of front wheels and the pair of rear wheels in a power transmittable manner, and a direct clutch configured to connect and disconnect between the input-side rotary element and the output-side rotary element, the fluid transmission device being configured to transmit a power of the first power source from the input-side rotary element to the output-side rotary element through a fluid; (c) a first output shaft which is configured to receive the power transmitted from the output-side rotary element of the fluid transmission device through a first power transmission path and which is configured to output the power to one of the pair of front wheels and the pair of rear wheels; (d) a rotary electric machine connected, in a power transmittable manner, to the first output shaft and/or the other of the pair of front wheels and the pair of rear wheels, through a second power transmission path that is other than the first power transmission path; and (e) a control device configured to establish, as a driving mode for driving the vehicle, a rotary-electric-machine driving mode using the rotary electric machine as a second power source, in a state in which an operation of the first power source is stopped, wherein, when the vehicle is stopped or running at an extremely low speed not higher than a threshold speed value, with the rotary-electric-machine driving mode being established as the driving mode, the control device is configured, upon determination that a drive request amount requested to the vehicle is larger than a threshold amount value, to place the direct clutch into an engaged state and to place the first power transmission path into a power transmittable state so as to cause the power of the first power source to be outputted to the first output shaft.

According to a second aspect of the invention, in the driving apparatus according to the first aspect of the invention, when the vehicle is stopped or running at the extremely low speed not higher than the threshold speed value, with the rotary-electric-machine driving mode being established as the driving mode, the control device is configured, upon determination that a temperature of the rotary electric machine is not lower than a threshold temperature value, to place the direct clutch into the engaged state and to place the first power transmission path into the power transmittable state.

According to a third aspect of the invention, in the driving apparatus according to the first or second aspect of the invention, the second power transmission path is provided with a speed change device that is configured to change a speed of rotation of the rotary electric machine in accordance with a gear ratio and to output the rotation whose speed has been changed, wherein the control device is configured to control the gear ratio of the speed change device, depending on the drive request amount, such that the gear ratio is higher when the drive request amount is larger than the threshold amount value, than when the drive request amount is not larger than the threshold amount value.

According to a fourth aspect of the invention, in the driving apparatus according to the third aspect of the invention, there is provided a second output shaft configured to output the power to the other of the pair of front wheels and the pair of rear wheels, wherein the speed change device includes: a differential device including a first rotary element connected to the rotary electric machine, a second rotary element connected to one of the first and second output shafts and a third rotary element connected to the other of the first and second output shafts, the differential device constituting a part of a torque distribution device that is configured to distribute a part of a torque inputted to the first output shaft, to the second output shaft; a first engagement device configured to connect and disconnect between two of the first, second and third rotary elements; and a second engagement device configured to connect and disconnect between the third rotary element and a non-rotary member.

According to a fifth aspect of the invention, in the driving apparatus according to the fourth aspect of the invention, the torque distribution device includes a connecting/disconnecting device that is to be placed in a selected one of (i) a first connection state in which the other of the first and second output shafts is connected to the third rotary element, (ii) a second connection state in which the other of the first and second output shafts is connected to the one of the first and second output shafts, and (iii) a disconnection state in which the other of the first and second output shafts is disconnected from the third rotary element and the one of the first and second output shafts, wherein the control device is configured to place the connecting/disconnecting device in the disconnection state, when the vehicle is running with deceleration with the rotary-electric-machine driving mode being established as the driving mode.

According to a sixth aspect of the invention, in the driving apparatus according to the fourth or fifth aspect of the invention, the first output shaft is another rotary element which is other than the first, second and third rotary elements of the differential device and which is configured to receive the power of the first power source.

According to a seventh aspect of the invention, in the driving apparatus according to any one of the first through sixth aspects of the invention, when the vehicle is stopped or running at the extremely low speed not higher than the threshold speed value, with the rotary-electric-machine driving mode being established as the driving mode, the control device is configured, upon determination that the vehicle is on an uphill road having a gradient not smaller than a threshold gradient value, to place the direct clutch into the engaged state and to place the first power transmission path into the power transmittable state.

According to an eighth aspect of the invention, in the driving apparatus according to any one of the first through seventh aspects of the invention, when the vehicle is stopped or running at the extremely low speed not higher than the threshold speed value, with the rotary-electric-machine driving mode being established as the driving mode, the control device is configured, upon determination that the vehicle has a weight not smaller than a threshold weight value, to place the direct clutch into the engaged state and to place the first power transmission path into the power transmittable state.

In the driving apparatus according to the first aspect of the invention, when the vehicle is stopped or running at the extremely low speed not higher than the threshold speed value, with the rotary-electric-machine driving mode being established as the driving mode, the control device is configured, upon determination that the drive request amount requested to the vehicle is larger than the threshold amount value, to place the direct clutch into the engaged state and to place the first power transmission path into the power transmittable state so as to cause the power of the first power source to be outputted to the first output shaft, thereby making it possible to reduce a torque that is to be outputted by the rotary electric machine and accordingly to suppress overheating of equipment such as the rotary electric machine. Moreover, since the direct clutch is placed in the engaged state, it is also possible to suppress loss of the power in the fluid transmission device.

In the driving apparatus according to the second aspect of the invention, when the vehicle is stopped or running at the extremely low speed not higher than the threshold speed value, with the rotary-electric-machine driving mode being established as the driving mode, the control device is configured, upon determination that the temperature of the rotary electric machine is not lower than the threshold temperature value, to place the direct clutch into the engaged state and to place the first power transmission path into the power transmittable state. Thus, in a case in which the equipment such as the rotary electric machine could be easily overheated, it is possible to place each of the direct clutch and the first power transmission path in advance in a prepared state for suppressing overheating of the equipment, i.e., a state in which the power can be immediately outputted to the first output shaft once the power is outputted from the first power source.

In the driving apparatus according to the third aspect of the invention, the second power transmission path is provided with the speed change device that is configured to change the speed of rotation of the rotary electric machine in accordance with the gear ratio and to output the rotation whose speed has been changed, wherein the control device is configured to control the gear ratio of the speed change device, depending on the drive request amount, such that the gear ratio is higher when the drive request amount is larger than the threshold amount value, than when the drive request amount is not larger than the threshold amount value. Thus, the torque that is to be outputted by the rotary electric machine can be reduced by also the speed change device.

In the driving apparatus according to the fourth aspect of the invention, the speed change device includes: the differential device including the first, second and third rotary elements; the first engagement device configured to connect and disconnect between two of the first, second and third rotary elements; and the second engagement device configured to connect and disconnect between the third rotary element and the non-rotary member. Thus, the speed change device can be constituted to include the differential device.

In the driving apparatus according to the fifth aspect of the invention, the torque distribution device, which is configured to distribute a part of the torque inputted to the first output shaft, to the second output shaft; includes the connecting/disconnecting device that is to be placed in a selected one of (i) the first connection state in which the other of the first and second output shafts is connected to the third rotary element, (ii) the second connection state in which the other of the first and second output shafts is connected to the one of the first and second output shafts, and (iii) the disconnection state in which the other of the first and second output shafts is disconnected from the third rotary element and the one of the first and second output shafts, wherein the control device is configured to place the connecting/disconnecting device in the disconnection state, when the vehicle is running with deceleration with the rotary-electric-machine driving mode being established as the driving mode. It is therefore possible to easily switch the rotary-electric-machine driving mode to another mode during the running of the vehicle with deceleration.

In the driving apparatus according to the sixth aspect of the invention, the first output shaft is another rotary element which is other than the first, second and third rotary elements of the differential device and which is configured to receive the power of the first power source. It is therefore possible to cause the power of the first power source to be outputted to the front and rear wheels without via the differential device, and accordingly to reduce drag of the differential device.

In the driving apparatus according to the seventh aspect of the invention, when the vehicle is stopped or running at the extremely low speed not higher than the threshold speed value, with the rotary-electric-machine driving mode being established as the driving mode, the control device is configured, upon determination that the vehicle is on the uphill road having the gradient not smaller than the threshold gradient value, to place the direct clutch into the engaged state and to place the first power transmission path into the power transmittable state. Thus, in the case in which the equipment such as the rotary electric machine could be easily overheated, it is possible to place each of the direct clutch and the first power transmission path in advance in the prepared state for suppressing overheating of the equipment, i.e., the state in which the power can be immediately outputted to the first output shaft once the power is outputted from the first power source.

In the driving apparatus according to the eighth aspect of the invention, when the vehicle is stopped or running at the extremely low speed not higher than the threshold speed value, with the rotary-electric-machine driving mode being established as the driving mode, the control device is configured, upon determination that the vehicle has the weight not smaller than the threshold weight value, to place the direct clutch into the engaged state and to place the first power transmission path into the power transmittable state. Thus, in the case in which the equipment such as the rotary electric machine could be easily overheated, it is possible to place each of the direct clutch and the first power transmission path in advance in the prepared state for suppressing overheating of the equipment, i.e., the state in which the power can be immediately outputted to the first output shaft once the power is outputted from the first power source.

BRIEF DESCRIPTION OF THE DRAWINGS

FIG. 3 is a table indicating a relationship between each gear position of an automatic transmission shown in FIG. 2 and a combination of engagement devices that are to be placed in engaged states to establish the each gear position;

FIG. 6 is a table indicating a relationship between each mode established in the transfer of FIG. 4 and controlled states of respective engagement devices in the transfer of FIG. 4;

FIG. 12 is a table indicating a relationship between each mode established in the transfer of FIG. 10 and controlled states of respective engagement devices in the transfer of FIG. 10.

DETAILED DESCRIPTION OF PREFERRED EMBODIMENTS

Hereinafter, preferred embodiments of the invention will be described in detail with reference to the accompanying drawings.

First Embodiment

Figure 1:
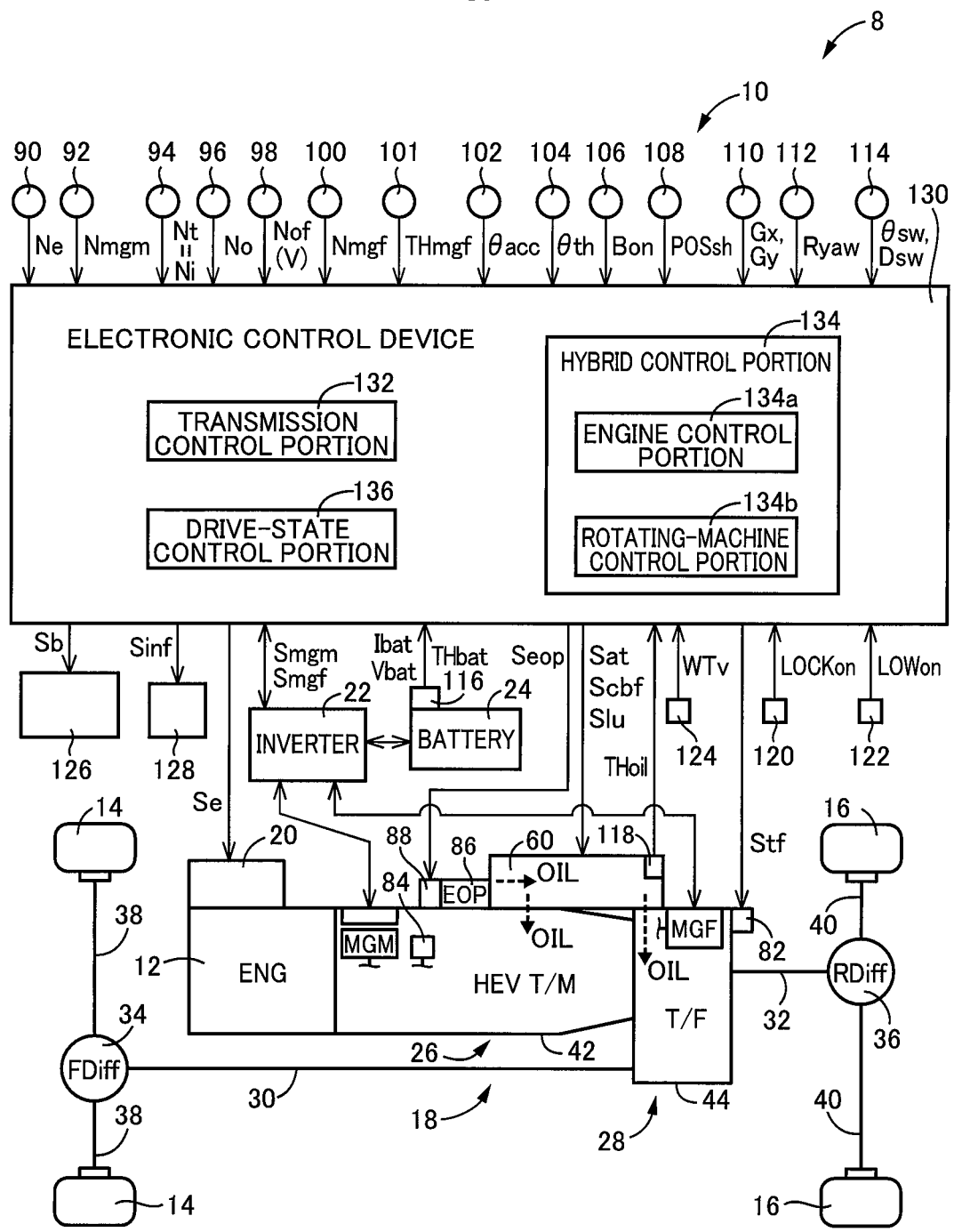
FIG. 1 is a view schematically showing a construction of a vehicle driving apparatus to which the present invention is applied, for explaining major control functions and control portions provided for performing various control operations in the vehicle driving apparatus.

FIG. 1 is a view schematically showing a construction of a vehicle driving apparatus 10 to which the present invention is applied, for explaining major control functions and control portions provided for performing various control operations in the vehicle driving apparatus 10. As shown in FIG. 1, the vehicle driving apparatus 10 includes power sources in the form of an engine 12 (that is represented by "ENG" in FIG. 1), a TM rotary electric machine MGM and a TF rotary electric machine MGF. Thus, a vehicle 8, in which the vehicle driving apparatus 10 is to be provided, is a hybrid vehicle having right and left front wheels (a pair of front wheels) 14 and right and left rear wheels (a pair of rear wheels) 16. The vehicle driving apparatus 10 includes a power transmission device 18 configured to transmit powers of the power sources such as the engine 12, to the front and rear wheels 14, 16. The engine 12, TM rotary electric machine MGM and TF rotary electric machine MGF will be simply referred to as "power sources PU" unless they are to be distinguished from one another. The power sources PU include a first power source PUT constituted by each of the engine 12 and the TM rotary electric machine MGM that output the powers to be transmitted to a torque converter 48 and an automatic transmission 50 (that will be described below), and a second power source PU2 which is constituted by the TF rotary electric machine MGF provided in a transfer 28 (that will be described below) and which is to be used as the power source in addition to or in place of the first power source PUT. It is noted that the TM rotary electric machine MGM and the TF rotary electric machine MGF correspond to "first rotary electric machine" and "second rotary electric machine", respectively, which are recited in the appended claims.

The vehicle 8 is an all-wheel drive vehicle capable of distributing a part of a torque, which is transmitted by the vehicle driving apparatus 10 to the rear wheels 16, to the front wheels 14. The vehicle driving apparatus 10 is capable of performing a rear-wheel drive by which the torque is transmitted only to the rear wheels 16 and also a front-wheel drive by which the torque is transmitted only to the front wheels 14. The vehicle 8 is also a four-wheel drive vehicle having four wheels consisting of the pair of front wheels 14 and the pair of rear wheels 16. In the description of the present embodiment, an all-wheel drive (=AWD) is synonymous with a four-wheel drive (=4WD). Each of the rear-wheel drive and the front-wheel drive is a two-wheel drive (=2WD). The front wheels 14 and rear wheels 16 will be simply referred to as "drive wheels DW" unless they are to be distinguished from one another.

The engine 12 is a known internal combustion engine such as gasoline engine and diesel engine. The driving apparatus 10 is provided with an engine control device 20 that includes a throttle actuator, a fuel injection device and an ignition device. With the engine control device 20 being controlled by an electronic control device 130 that is described below, an engine torque Te, which is an output torque of the engine 12, is controlled.

Each of the TM rotary electric machine MGM and the TF rotary electric machine MGF is a rotary electric machine having a function serving as a motor for generating a mechanical power from an electric power and also a function serving a generator for generating an electric power from a mechanical power. That is, each of the TM rotary electric machine MGM and the TF rotary electric machine MGF is a so-called "motor generator". Each of the TM rotary electric machine MGM and the TF rotary electric machine MGF is connected to a battery 24 via an inverter 22, wherein the battery 24 and the inverter 22 are both provided in the vehicle driving apparatus 10. With the inverter 22 being controlled by the electronic control device 130 that is described below, an MGM torque Tmgm as an output torque of the TM rotary electric machine MGM and an MGF torque Tmgf as an output torque of the TF rotary electric machine MGF are controlled. Each of the MGM torque Tmgm and the MGF torque Tmgf serves as a power driving torque (that may be referred also to as "motor torque") when a corresponding one of the TM rotary electric machine MGM and the TF rotary electric machine MGF functions as the motor, and serves as a regenerative torque (that may be referred also to as "power generation torque") when a corresponding one of the TM rotary electric machine MGM and the TF rotary electric machine MGF functions as the generator. The battery 24 is a power storage device to and from which the electric power is to be supplied from and to each of the TM rotary electric machine MGM and the TF rotary electric machine MGF. The above-described electric power corresponds to an electric energy, unless otherwise specified. Similarly, the above-described power corresponds to a drive power, a torque and a force, unless otherwise specified.

The power transmission device 18 includes a hybrid transmission 26 (see "HEV T/M" in FIG. 1), the transfer 28 (see "T/F" in FIG. 1), a front propeller shaft 30, a rear propeller shaft 32, a front differential device 34 (see "FDiff" in FIG. 1), a rear differential device 36 (see "RDiff" in FIG. 1), right and left front drive shafts 38 and right and left rear drive shafts 40. In the power transmission device 18, the power is transmitted from the first power source PUT to the transfer 28 via the hybrid transmission 26, and then is transmitted from the transfer 28 to the rear wheels 16 sequentially via the rear propeller shaft 32, rear differential device 36 and rear drive shafts 40, for example. Further, in the power transmission device 18, when a part of the power transmitted from the first power source PUT to the transfer 28 is to be distributed to the front wheels 14, the part of the power is transmitted to the front wheels 14 sequentially via the front propeller shaft 30, front differential device 34 and front drive shafts 38, for example.

The hybrid transmission 26 includes a non-rotary member in the form of a transmission case 42. The transfer 28 includes a non-rotary member in the form of a transfer case 44 that is connected to the transmission case 42. The TM rotary electric machine MGM is disposed inside the transmission case 42. The TF rotary electric machine MGF is disposed inside the transfer case 44.

Figure 2:
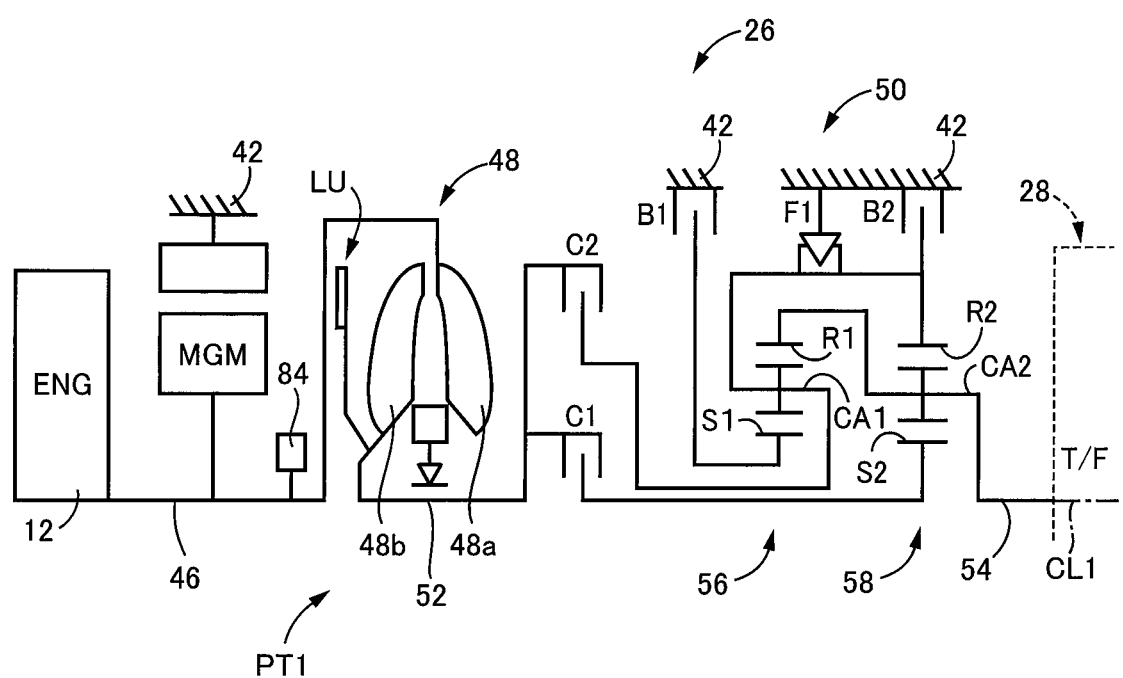
FIG. 2 is a view schematically showing a construction of a hybrid transmission shown in FIG. 1.

FIG. 2 is a view schematically showing a construction of the hybrid transmission 26. As shown in FIG. 2, the hybrid transmission 26 includes a connection shaft 46, the torque converter 48 and the automatic transmission 50 which are provided inside the transmission case 42 and which are disposed on a common axis in the form of a rotation axis CS1. The hybrid transmission 26 constitutes a part of a first power transmission path PT1 through which the power is to be transmitted to the drive wheels DW via the torque converter 48. Each of the torque converter 48 and the automatic transmission 50 is constructed substantially symmetrically about the rotation axis CL1, so that its lower half (that is located on a lower side of the rotation axis CL1) is not shown in FIG. 2. The rotation axis CL1 corresponds to an axis of a crankshaft of the engine 12, an axis of the connection shaft 46 connected to the crankshaft, an axis of a transmission input shaft 52 that is an input rotary member of the automatic transmission 50 and an axis of a transmission output shaft 54 that is an output rotary member of the automatic transmission 50.

The connection shaft 46 is a rotary shaft connecting between the engine 12 and the torque converter 48. The torque converter 48 includes a pump impeller 48a connected to the connection shaft 46, and a turbine impeller 48b connected to the transmission input shaft 52. The pump impeller 48a is an input member of the torque converter 48, and is an input-side rotary element of the torque converter 48 to which the first power source PUT is connected in a power transmittable manner. The turbine impeller 48b is an output member of the torque converter 48, and is an output-side rotary element of the torque converter 48 to which the drive wheels DW are connected in a power transmittable manner. TM rotary electric machine MGM is connected to the connection shaft 46 in a power transmittable manner, namely, is connected to the pump impeller 48a in a power transmittable manner. The connection shaft 46 is also an input rotary member of the torque converter 48. The transmission input shaft 52 is also an output rotary member of the torque converter 48 which is provided integrally with a turbine shaft that is to be driven and rotated by the turbine impeller 48b. The torque converter 48 is a fluid transmission device configured to transmit the power of the first power source PUT to the transmission input shaft 52 through fluid, namely, a fluid transmission device configured to transmit the power of the first power source PUT from the pump impeller 48a to the turbine impeller 48b through fluid. The torque converter 48 includes a lockup clutch LU configured to connect between the pump impeller 48a and the turbine impeller 48b. The lockup clutch LU is a known lockup clutch, namely, a direct connection clutch configured to connect between the input and output rotary members of the torque converter 48.

A controlled state, i.e., an operation state of the lockup clutch LU is switched as an LU torque Tlu as a torque capacity of the lockup clutch LU is changed depending on an LU hydraulic pressure PRlu that is a regulated hydraulic pressure supplied from a hydraulic control circuit or unit 60 (see FIG. 1) which is provided in the vehicle driving apparatus 10 and which is to be controlled by the electronic control device 130. As the controlled state of the lockup clutch LU, there are a released state in which the lockup clutch LU is fully released, a slipping state in which the lockup clutch LU is engaged with slippage, and an engaged state in which the lockup clutch LU is fully engaged. With the lockup clutch LU being placed in the released state, the torque converter 48 is placed in a torque converter state that provides a torque boosting effect. With the lockup clutch LU being placed in the engaged state, the torque converter 48 is placed in a lockup state in which the pump impeller 48a and the turbine impeller 48b are rotatable integrally with each other.

The automatic transmission 50 is disposed in a power transmission path between the torque converter 48 and the transfer 28. The transmission output shaft 54 is connected to the transfer 28. The automatic transmission 50 is a first transmission device configured to transmit the power of the first power source PUT to the transfer 28. Thus, each of the torque converter 48 and the automatic transmission 50 is configured to transmit the power of the first power source PUT to the transfer 28.

The automatic transmission 50 is a known automatic transmission of planetary gear type that includes, for example, a plurality of planetary gear devices in the form of first and second planetary gear devices 56, 58, and a plurality of engagement devices in the form of a one-way clutch F1, clutches C1, C2 and brakes B1, B2. Hereinafter, the clutches C1, C2 and the brakes B1, B2 will be simply referred to as "engagement devices CB" unless they are to be particularly distinguished from one another.

Each of the engagement devices CB is a known hydraulically-operated frictional engagement device in the form of a multiple-disc type or a single-disc type clutch or brake that is to be pressed by a hydraulic actuator, or a band brake that is to be tightened by a hydraulic actuator. Each of the engagement devices CB is configured to receive a CB hydraulic pressure PRcb that is a regulated hydraulic pressure supplied from a hydraulic control circuit or unit 60, whereby a CB torque Tcb, i.e., torque capacity of the engagement device CB is changed and its controlled or operation state is switched between an engaged state and a released state, for example.

In the automatic transmission 50, rotary elements of the first and second planetary gear devices 56, 58 are to be connected to each other directly or indirectly via the engagement devices CB or the one-way clutch F1, or to the transmission input shaft 52, the transmission case 42 or the transmission output shaft 54. The rotary elements of the first planetary gear device 56 are a sun gear S1, a carrier CA1 and a ring gear R1. The rotary elements of the second planetary gear device 58 are a sun gear S2, a carrier CA2 and a ring gear R2.

The automatic transmission 50 is a step-variable automatic transmission configured to establish a selected one of a plurality of gear positions, with a corresponding one or ones of the engagement devices CB being engaged, wherein the gear positions are different from each other in gear ratio (speed ratios) γat (=AT input rotational speed Ni/AT output rotational speed No). The automatic transmission 50 is configured to switch from one of the gear positions to another one of the gear positions, namely, to establish one of the gear positions which is selected, by the electronic control device 130, depending on, for example, an accelerating operation made by a vehicle driver (operator) and a running speed V of the vehicle 8. In the description of the present embodiment, the gear positions that are to be established in the automatic transmission 50 will be referred to as "AT gear positions". The AT input rotational speed Ni is a rotational speed of the transmission input shaft 52, and is an input rotational speed of the automatic transmission 50. The AT input rotational speed Ni is equal to a turbine rotational speed Nt that is a rotational speed of the turbine shaft that is to be driven and rotated by the turbine impeller 48b. The AT output rotational speed No is a rotational speed of the transmission output shaft 54, and is an output rotational speed of the automatic transmission 50.

As shown in a table of FIG. 3, the automatic transmission 50 is configured to establish a selected one of the plurality of AT gear positions including four forward gear positions. Among the four forward gear positions, an AT1-speed gear position (represented by "1st" in the table of FIG. 3) provides the highest gear ratio γat, and an AT4-speed gear position (represented by "4th" in the table of FIG. 3) provides the lowest gear ratio γat and enables the vehicle 8 to run at a higher running speed V than the other gear positions. The table of FIG. 3 indicates a relationship between each of the AT gear positions and a combination of the engagement devices CB that are to be placed in engaged states to establish the each of the AT gear positions. In the table, "○" indicates that the corresponding engagement device CB is placed in its engaged state, "Δ" indicates that the corresponding engagement device CB is placed in its engaged state during application of an engine brake to the vehicle 8 or during a coasting shift-down action of the automatic transmission 50, and blank indicates that the corresponding engagement device CB is placed in its released (disengaged) state. With any one of the four forward gear positions being established in the automatic transmission 50, the automatic transmission 50 is placed in a power transmittable state in which the power is transmittable through the automatic transmission 50. In a neutral state (represented by "N" in the table of FIG. 3) of the automatic transmission 50 which is established, for example, with all of the engagement devices CB being placed in the released states, the automatic transmission 50 is placed in a power untransmittable state in which the power is not transmittable through the automatic transmission 50, namely, a power transmission through the automatic transmission 50 is cut off. When the vehicle 8 is to run in a reverse direction, the automatic transmission 50 is placed in the neutral state (see "Rev" in the table of FIG. 3), with the power being outputted by the TF rotary electric machine MGF, for example.

Figure 4:
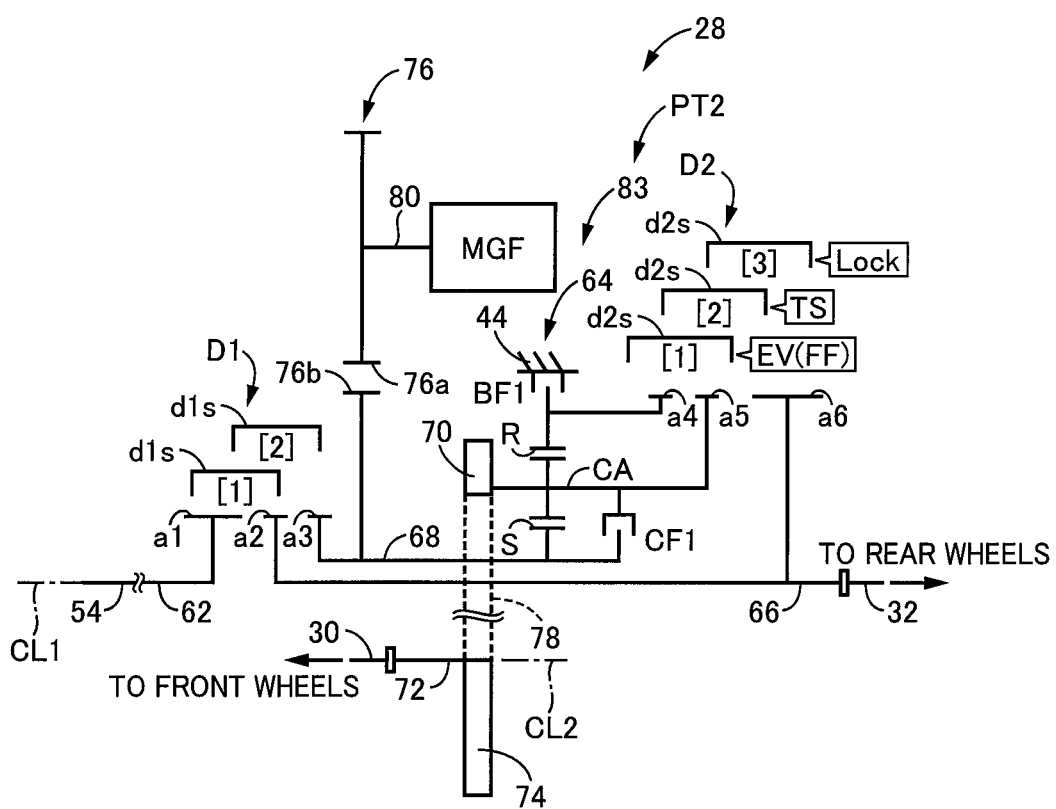
FIG. 4 is a view schematically showing a construction of a transfer shown in FIG. 1.

FIG. 4 is a view schematically showing a construction of the transfer 28. As shown in FIG. 4, the transfer 28 includes a TF input shaft 62, a differential device 64, a TF clutch CFT, a TF brake BF1, a first output shaft 66, an intermediate shaft 68, first and second dog clutches D1, D2 and a drive gear 70, which are provided inside the transfer case 44 and which are disposed on the common rotation axis CL1. Each of the differential device 64, TF clutch CFT, TF brake BF1, intermediate shaft 68, first and second dog clutches D1, D2 and drive gear 70 is constructed substantially symmetrically about the rotation axis CL1, so that its lower half (that is located on a lower side of the rotation axis CL1) is not shown in FIG. 4.

The transfer 28 further includes a second output shaft 72 and a driven gear 74 which are provided inside the transfer case 44 and which are disposed on a common axis in the form of a rotation axis CL2. The driven gear 74 is constructed substantially symmetrically about the rotation axis CL2, so that its upper half (that is located on an upper side of the rotation axis CL2) is not shown in FIG. 4. The rotation axis CL2 corresponds to an axis of the second output shaft 72, for example.

The transfer 28 further includes the TF rotary electric machine MGF, a pair of connection gears 76 and a chain 78 that are provided inside the transfer case 44. The pair of connection gears 76 consists of a TF rotary-electric-machine connection gear 76a that is to be rotated integrally with a rotor shaft 80 of the TF rotary electric machine MGF, and a TF counter gear 76b that constantly meshes with the TF rotary-electric-machine connection gear 76a. The chain 78 is a member connecting between the drive gear 70 and the driven gear 74.

The transfer 28 further includes a switch actuator 82 (see FIG. 1) fixed to the transfer case 44. The switch actuator 82 is an actuator provided to operate the first and second dog clutches D1, D2.

Each of the TF clutch CF1 and the TF brake BF1 is a known wet-type hydraulically-operated frictional engagement device constituted by a multiple-disc type or single-disc type clutch that is to be pressed by a hydraulic actuator. A controlled state of the TF clutch CF1 is switched between the engaged state and the released state, for example, with change of a CF1 torque Tcf1 that is a torque capacity of the TF clutch CF1, wherein the change of the CF1 torque Tcf1 is made by a CF1 pressure PRcf1 that is a hydraulic pressure of the TF clutch CF1 supplied and regulated by the hydraulic control unit 60. Similarly, a controlled state of the TF brake BF1 is switched between the engaged state and the released state, for example, with change of a BF1 torque Tbf1 that is a torque capacity of the TF brake BF1, wherein the change of the BF1 torque Tbf1 is made by a BF1 pressure PRbf1 that is a hydraulic pressure of the TF brake BF1 supplied and regulated by the hydraulic control unit 60. Each of the first and second dog clutches D1, D2 is a known dog clutch, i.e., a known claw clutch. With the switch actuator 82 being controlled by the electronic control device 130 that is described below, the controlled state of each of the first and second dog clutches D1, D2 is switched.

The TF input shaft 62 is connected to the transmission output shaft 54 in a power transmittable manner. The first output shaft 66 is connected to the rear propeller shaft 32 in a power transmittable manner. The second output shaft 72 is connected to the front propeller shaft 30 in a power transmittable manner. The driven gear 74 is fixed to the second output shaft 72, unrotatably relative to the second output shaft 72. The TF counter gear 76b is fixed to the intermediate shaft 68, unrotatably relative to the intermediate shaft 68.

The differential device 64 is constituted by a single-pinion-type planetary gear device, and includes a sun gear S, a carrier CA and a ring gear R. The sun gear S is fixed to the intermediate shaft 68, unrotatably relative to the intermediate shaft 68, so that the TF rotary electric machine MGF is connected to the sun gear S via the pair of connection gears 76. The carrier CA is connected to the drive gear 70, so that the second output shaft 72 is connected to the carrier CA via the drive gear 70, chain 78 and driven gear 74. The ring gear R is selectively connected to the transfer case 44 via the TF brake BF1. The sun gear S and the carrier CA are selectively connected to each other via the TF clutch CF1 that corresponds to "first engagement device" recited in the appended claims. The TF brake BF1, via which the ring gear R is selectively connected to the transfer case 44, corresponds to "second engagement device" recited in the appended claims.

The first dog clutch D1 includes first dog teeth a1, second dog teeth a2, third dog teeth a3 and a first sleeve d1s. The first dog teeth a1 is fixed to the TF input shaft 62, unrotatably relative to the TF input shaft 62. The second dog teeth a2 is fixed to the first output shaft 66, unrotatably relative to the first output shaft 66. The third dog teeth a3 is fixed to the intermediate shaft 68, unrotatably relative to the intermediate shaft 68. The first sleeve d1s is movable relative to the first, second and third dog teeth a1, a2, a3, in a direction of the rotation axis CL1, i.e., in a direction parallel to the rotation axis CL1. The first sleeve d1s has inner circumferential teeth that can mesh with the first, second and third dog teeth a1, a2, a3, so as to be unrotatable relative to the TF input shaft 62, first output shaft 66 and intermediate shaft 68. With the first sleeve d1s being moved in the direction of the rotation axis CL1 by operation of the switch actuator 82, the first sleeve d1s is engaged with or released from the first, second and third dog teeth a1, a2, a3. When the first dog clutch D1 is placed in a first state [1](see FIG. 4), the first sleeve d1s is engaged with the first dog teeth a1 and the second dog teeth a2 whereby the first and second dog teeth a1, a2 are connected to each other. When the first dog clutch D1 is placed in a second state [2] (see FIG. 4), the first sleeve d1s is engaged with the first dog teeth a1 and the third dog teeth a3 whereby the first and third dog teeth a1, a3 are connected to each other. It is noted that FIG. 4 shows the first sleeve d1s when the first sleeve d1s is placed in each of the first state [1] and the second state [2], for convenience of description.

The second dog clutch D2 includes fourth dog teeth a4, fifth dog teeth a5, sixth dog teeth a6 and a second sleeve d2s. The fourth dog teeth a4 is fixed to the ring gear R. The fifth dog teeth a5 is fixed to the carrier CA. The sixth dog teeth a6 is fixed to the first output shaft 66, unrotatably relative to the first output shaft 66. The second sleeve d2s is movable relative to the fourth, fifth and sixth dog teeth a4, a5, a6, in the direction of the rotation axis CL1. The second sleeve d2s has inner circumferential teeth that can mesh with the fourth, fifth and sixth dog teeth a4, a5, a6, so as to be unrotatable relative to the ring gear R, carrier CA and first output shaft 66. With the second sleeve d2s being moved in the direction of the rotation axis CL1 by operation of the switch actuator 82, the second sleeve d2s is engaged with or released from the fourth, fifth and sixth dog teeth a4, a5, a6. When the second dog clutch D2 is placed in a first state [1] (see FIG. 4), the second sleeve d2s is not engaged with any one of the fourth, fifth and sixth dog teeth a4, a5, a6 so that a neutral state is established with any one of the fourth, fifth and sixth dog teeth a4, a5, a6 being not connected to the others of the fourth, fifth and sixth dog teeth a4, a5, a6. When the second dog clutch D2 is placed in a second state [2] (see FIG. 4), the second sleeve d2s is engaged with the fourth dog teeth a4 and the sixth dog teeth a6 whereby the fourth and sixth dog teeth a4, a6 are connected to each other so that the first output shaft 66 is connected to the ring gear R via the second dog clutch D2 that is placed in the second state [2]. When the second dog clutch D2 is placed in a third state [3] (see FIG. 4), the second sleeve d2s is engaged with the fifth dog teeth a5 and the sixth dog teeth a6 whereby the fifth and sixth dog teeth a5, a6 are connected to each other. It is noted that FIG. 4 shows the second sleeve d2s when the second sleeve d2s is placed in each of the first state [1], second state [2] and third state [3], for convenience of description.

In the transfer 28, the first output shaft 66 is connected to the ring gear R via the second dog clutch D2 when the second dog clutch D2 is in the second state [2], and is connected to the second output shaft 72 via the second dog clutch D2 when the second dog clutch D2 is in the third state [3]. The second state [2] of the second dog clutch D2 corresponds to a first connection state in which the first output shaft 66 is connected to the ring gear R. The third state [3] of the second dog clutch D2 corresponds to a second connection state in which the first output shaft 66 is connected to the second output shaft 72. The first state [1] of the second dog clutch D2 corresponds to a disconnection state in which the first output shaft 66 is connected to neither the ring gear R nor the second output shaft 72. The second dog clutch D2 corresponds to a connecting/disconnecting device that is to be placed in a selected one of the first connection state, second connection state and disconnection state.

Figure 5:
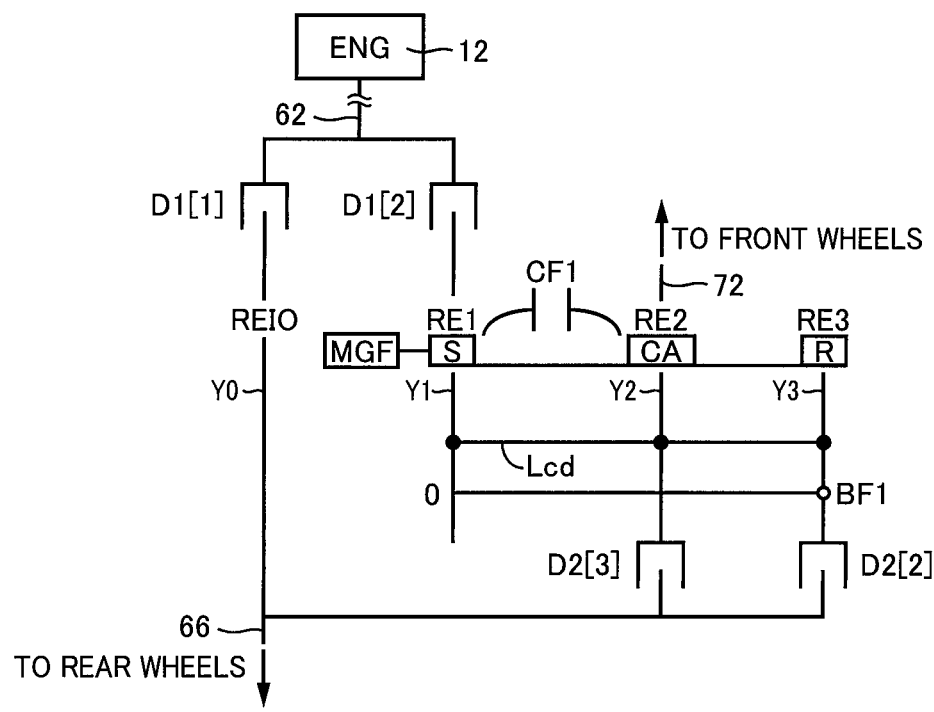
FIG. 5 is a collinear chart indicating a relationship among rotational speeds of rotary elements of the transfer of FIG. 4.

FIG. 5 is a collinear chart indicating a relationship among rotational speeds of rotary elements of the transfer 28. In FIG. 5, three vertical lines Y1, Y2, Y3 corresponding to the three rotary elements of the differential device 64 constituting the transfer 28 are an axis representative of a rotational speed of the sun gear S corresponding to a first rotary element RET, an axis representative of a rotational speed of the carrier CA corresponding to a second rotary element RE2, and an axis representative of a rotational speed of the ring gear R corresponding to a third rotary element RE3, in order from the left side. Further, in FIG. 5, a vertical line Y0, which is located on a left side of the vertical line Y1, is an axis representative of a rotational speed of the first output shaft 66 corresponding to an input/output rotary element REIO that is a rotary element other than the three rotary elements of the differential device 64.

As shown in the collinear chart of FIG. 5, in the transfer 28, the input/output rotary element REIO is selectively connected to the TF input shaft 62 via the first dog clutch D1 that is placed in the first state [1], and is connected to the rear propeller shaft 32. The first power source PU1 including the engine 12 is connected to the TF input shaft 62 via the hybrid transmission 26 in a power transmittable manner. Further, in the differential device 64, the first rotary element RE1 is connected to the TF rotary electric machine MGF in a power transmittable manner, and is selectively connected to the TF input shaft 62 via the first dog clutch D1 that is placed in the second state [2]. The second rotary element RE2 is connected to the second output shaft 72, i.e., the front propeller shaft 30, and is selectively selected to the first output shaft 66, i.e., the rear propeller shaft 32, via the second dog clutch D2 that is placed in the third state [3]. The third rotary element RE3 is selectively connected to the first output shaft 66 via the second dog clutch D2 that is placed in the third state [2], and is selectively connected to the transfer case 44 via the TF brake BF1. Moreover, the first and second rotary elements RET, RE2 are selectively connected to each other via the TF clutch CF1. In the collinear chart of FIG. 5, the relationship among the rotational speeds of the respective first, second and third rotary elements RET, RE2, RE3 in the differential device 64 is represented by a straight line Lcd. The first output shaft 66 is an output shaft to which the power of the first power source PUT is to be inputted via the torque converter 48 and from which is the power is to be outputted to the rear wheels 16. That is, the first output shaft 66 is an output shaft from which the power, inputted through the first power transmission path PT1 (provided with the automatic transmission 50) from the turbine impeller 48b of the torque converter 48, is to be outputted to the rear wheels 16. The second output shaft 72 is an output shaft from which the power is to be outputted to the front wheels 14.

In the differential device 64, when the TF clutch CF1 is in the engaged state and the TF brake BF1 is in the released state, the first, second and third rotary elements RET, RE2, RE3 are rotatable integrally with one another. On the other hand, in the differential device 64, when the TF clutch CFT is in the released state and the TF brake BF1 is in the engaged state, the rotational speed of the second rotary element RE2 is made lower than the rotational speed of the first rotary element RE1. The transfer 28 includes a speed change device 83 (see FIG. 4) including the TF clutch CF1, the TF brake BF1 and the differential device 64 that constitutes a part of the transfer 28.

The speed change device 83 serves as a second transmission device configured to change a speed of rotation of the TF rotary electric machine MGF and to output the rotation whose speed has been changed. That is, the speed change device 83 serves as a TF transmission configured to establish a selected one of a high-speed gear position and a low-speed gear position, wherein the high-speed gear position is established with the TF clutch CF1 being placed in the engaged state, and the low-speed gear position is established with the TF brake BF1 being placed in the engaged state. The high-speed gear position of the speed change device 83 is a high-running-speed gear position providing a relatively low gear ratio, while the low-speed gear position of the speed change device 83 is a low-running-speed gear position providing a relative high gear ratio, wherein the gear ratio is a ratio of the rotational speed of the first rotary element RE1 to the rotational speed of the second rotary element RE2 (=(rotational speed of first rotary element RE1)/(rotational speed of second rotary element RE2)). From another point of view, the speed change device 83 constitutes a part of the second power transmission path PT2 that is different from the first power transmission path PT1. That is, the second power transmission path PT2 is provided with the speed change device 83. The TF rotary electric machine MGF is connected to the drive wheels DW through the second power transmission path in a power transmittable manner.

The differential device 64 is capable of activating a differential effect when both of the F clutch CF1 and the TF brake BF1 being are in the released states. Thus, the differential device 64 serves as a center differential. In this instance, with the first dog clutch D1 being in the first state [1] and with the second dog clutch D2 being in the second state [2] in the transfer 28, the differential device 64 can cause the torque of the first power source PU1 inputted to the third rotary element RE3, to be distributed to the second rotary element RE2, owing a reaction torque of the TF rotary electric machine MGF connected to the first rotary element RE1. Further, the differential device 64 can cause the torque of the first power source PU1 inputted to the third rotary element RE3, to be distributed to the second rotary element RE2, also by limiting the differential effect of the differential device 64 by placing the TF clutch CF1 in a slipping state, in place of applying the reaction torque of the TF rotary electric machine MGF. Thus, the transfer 28 is a torque distribution device configured to distribute a part of the torque inputted to the first output shaft 66, to the second output shaft 72, for thereby making it possible to distribute the torque between the front wheels 14 and the rear wheels 16. It is noted that, in the transfer 28, when the second dog clutch D2 is in the third state [3], the differential device 64 is placed in a differential lock state in which the differential device 64 does not function as the center differential.

FIG. 6 is a table indicating a relationship between each mode established in the transfer 28 and controlled states of respective the engagement devices in the transfer 28. In FIG. 6, "○" in columns of the TF brake BF1 and the TF clutch CFT indicates that the TF brake BF1 or TF clutch CFT is in its engaged state, and blank in the columns of the TF brake BF1 and the TF clutch CF1 indicates that the TF brake BF1 or TF clutch CFT is in its released state. Further, in FIG. 6, "○" in columns of the first and second dog clutches D1, D2 indicates that the first dog clutch D1 or second dog clutch D2 is placed in the corresponding state, and "(○)" in the column of the first dog clutch D1 indicates that the first dog clutch D1 may be placed in its released state where the first dog clutch D1 can be placed in the released state.

FIG. 6 shows six modes numbered from m1 to m6. Each of "EV (FF) HIGH" mode of number m1 and "EV (FF) LOW" mode of number m2 is established with a corresponding one of the TF clutch CFT and the TF brake BFT being placed in the engaged state and with the first and second dog clutches D1, D2 being placed in the respective first states [1]. Each of the "EV (FF) HIGH" mode and the "EV (FF) LOW" mode is a transfer motor mode (=TrEV mode) that enables a motor running (=BEV running) in which the vehicle 8 runs, for example, with only the TF rotary electric machine MGF serving as the power source. With the second dog clutch D2 being placed in the first state [1], the neutral state (see "N" in FIG. 6) is established with any one of the fourth, fifth and sixth dog teeth a4, a5, a6 being not connected to the others of the fourth, fifth and sixth dog teeth a4, a5, a6, so that a power transmission path between the differential device 64 and the rear wheels 16 is cut off. In this state in which the second dog clutch D2 being placed in the first state [1], the power of the TF rotary electric machine MGF is transmitted toward the front wheels 14 in the speed change device 83 in which the high-speed gear position is established with the TF clutch CF1 being in the engaged state or the low-speed gear position is established with the TF brake BF1 being in the engaged state. Thus, in the present embodiment, the BEV running is performed by a front-wheel drive running. In the TrEV mode, it is possible to avoid drag of the engine 12, for example, with the automatic transmission 50 being placed in the neutral state when the first dog clutch D1 is in the first state [1]. Where the first dog clutch D1 can be placed in the released state, it is possible to avoid drag of the engine 12 and drag of the automatic transmission 50, with the first dog clutch D1 being placed in the released state, even without the automatic transmission 50 being placed in the neutral state. Further, in the TrEV mode that is the "EV (FF) HIGH" mode or "EV (FF) LOW" mode, the power of the first power source PU1 can be transmitted to the rear wheels 16, for example, with the first dog clutch D1 being placed in the first state [1], so that it is possible to perform an engine running, i.e., a hybrid running (=HEV running) in which the vehicle 8 runs with at least the engine 12 serving as the power source. In this engine running, for example, an AWD running by a parallel hybrid running or a rear-wheel drive running by only the power of the first power source PU1 can be performed.

"H4_TORQUE SPLIT" mode of number m3 is established with both of the TF clutch CF1 and the TF brake BF1 being placed in the respective released states and with the first dog clutch D1 and second dog clutch D2 being placed in the first state [1] and the second state [2], respectively. The "H4_TORQUE SPLIT" mode is a mode for distributing the torque between the front wheels 14 and the rear wheels 16 at a desired ratio that is dependent on the reaction torque of the TF rotary electric machine MGF, for example, with the torque of the first power source PU1 transmitted from the first output shaft 66 to the differential device 64 being held by the sun gear S to which the reaction torque of the TF rotary electric machine MGF is applied, and with the speed change device 83 being placed in a state corresponding to the high-speed gear position. In the "H4_TORQUE SPLIT" mode established in the transfer 28, the TF rotary electric machine MGF performs a power driving.

"H4_LSD" mode of number m4 is established with the TF clutch CF1 being controlled in the slipping state and the TF brake BF1 being placed in the released state, and with the first dog clutch D1 and the second dog clutch D2 being placed in the first state [1] and the second state [2], respectively. The "H4_LSD" mode is a mode for distributing the torque between the front wheels 14 and the rear wheels 16 at a desired ratio that is dependent on the torque capacity of the TF clutch CF1, by limiting the differential effect of the differential device 64 by placing the TF clutch CF1 in the slipping state, in place of applying the reaction torque of the TF rotary electric machine MGF in the "H4_TORQUE SPLIT" mode.

"H4_Lock" mode of number m5 is established with both of the TF clutch CF1 and the TF brake BF1 being placed in the respective released states and with the first dog clutch D1 and the second dog clutch D2 being placed in the first state [1] and the third state [3], respectively. The "H4_Lock" mode is a mode for distributing the torque of the first power source PU1 transmitted to the first output shaft 66, between the front wheels 14 and the rear wheels 16, with the differential device 64 being placed in the differential lock state. In the "H4_Lock" mode, the power of the TF rotary electric machine MGF can be added to a drive torque Tr, for example, with the TF clutch CF1 being placed in the engaged state.

"L4_Lock" mode of number m6 is established with the TF clutch CF1 and the TF brake BF1 being placed in the released state and the engaged state, respectively and with the first dog clutch D1 and the second dog clutch D2 being placed in the second state [2] and the third state [3], respectively. The "L4_Lock" mode is a mode for distributing the torque of the first power source PU1 transmitted to the sun gear S of the differential device 64, between the front wheels 14 and the rear wheels 16, with the differential device 64 being placed in the differential lock state and with the speed change device 83 being placed in the low-speed gear position. In the "L4_Lock" mode, the power of the TF rotary electric machine MGF can be added to the drive torque Tr.

Referring back to FIG. 1, the vehicle driving apparatus 10 includes an MOP 84 that is a mechanically-operated oil pump, an EOP 86 that is an electrically-operated oil pump, and a pump motor 88. The MOP 84 is connected to the connection shaft 46 (see FIG. 2), and is to be driven and rotated by the first power source PU1, so as to output a working fluid OIL that is to be used in the power transmission apparatus 18. The pump motor 88 is a motor serving exclusively to drive and rotate the EOP 86. The EOP 86 outputs the working fluid OIL, when being driven and rotated by the pump motor 88. The working fluid OIL outputted by the MOP 84 and the EOP 86 is supplied to the hydraulic control unit 60. The hydraulic control unit 60, which receives the working fluid OIL as an original hydraulic pressure, supplies regulated hydraulic pressures that serve as the LU hydraulic pressure PRlu, the CB hydraulic pressure PRcb, the CF1 pressure PRcf1 and the BF1 pressure PRbf1, for example.

The vehicle driving apparatus 10 is provided with the electronic control device 130 as a controller including a control device that is configured to control the power sources PU and the transfer 28. FIG. 1 shows an input/output system of the electronic control device 130, and is also a functional block diagram explaining major portions of control functions of the electronic control device 130. The electronic control device 130 includes a so-called microcomputer incorporating a CPU, a ROM, a RAM and an input-output interface. The CPU performs various control operations of the vehicle driving apparatus 10, by processing various input signals, according to control programs stored in the ROM, while utilizing a temporary data storage function of the RAM. The electronic control device 130 may be constituted by two or more control units exclusively assigned to perform respective different control operations such as an engine control operation and a shift control operation.

The electronic control device 130 receives various input signals based on values detected by respective sensors provided in the vehicle driving apparatus 10. Specifically, the electronic control device 130 receives: an output signal of an engine speed sensor 90 indicative of an engine rotational speed Ne that is a rotational speed of the engine 12; an output signal of an MGM speed sensor 92 indicative of an MGM rotational speed Nmgm that is a rotational speed of the TM rotary electric machine MGM, an output signal of a turbine speed sensor 94 indicative of a turbine rotational speed Nt that is equal to the AT input rotational speed Ni; an output signal of an AT output speed sensor 96 indicative of the AT output rotational speed No; an output signal of a vehicle speed sensor 98 indicative of a TF output rotational speed Nof which is a rotational speed of the first output shaft 66 and which corresponds to the vehicle running speed V; an output signal of an MGF speed sensor 100 indicative of an MGF rotational speed Nmgf that is a rotational speed of the TF rotary electric machine MGF; an output signal of an MGF temperature sensor 101 indicative of an MGF temperature THmgf that is a temperature of the TF rotary electric machine MGF; an output signal of an accelerator-opening degree sensor 102 indicative of an accelerator opening degree (accelerator operation degree) θacc representing an amount of accelerating operation made by the vehicle driver; an output signal of a throttle-opening degree sensor 104 indicative of a throttle opening degree θth which is an opening degree of an electronic throttle valve; an output signal of a brake pedal sensor 106 which is a brake-ON signal Bon representing a state in which a brake pedal is being operated by the vehicle driver so as to operate wheel brakes; an output signal of a shift position sensor 108 indicative of a shift operation position POSsh that is an operation position of a shift lever provided in the vehicle 8; an output signal of an acceleration sensor 110 indicative of a longitudinal acceleration Gx and a lateral acceleration Gy of the vehicle 8; an output signal of a yaw rate sensor 112 indicative of a yaw rate Ryaw that is a rotational angular speed of the vehicle 8 about its vertical axis; an output signal of a steering sensor 114 indicative of a steering angle θsw and a steering direction Dsw of a steering wheel provided in the vehicle 8; an output signal of a battery sensor 116 indicative of a battery temperature THbat, a battery charging/discharging electric current Ibat and a battery voltage Vbat of the battery 24; an output signal of a fluid temperature sensor 118 indicative of a working-fluid temperature THoil that is a temperature of the working fluid OIL in the hydraulic control unit 60; an output signal of a differential-lock selection switch 120 which is a lock-mode ON signal LOCKon indicating that the "H4_Lock" mode or "L4_Lock" mode is selected by the vehicle driver; an output signal of a low-gear selection switch 122 which is a low-gear ON signal LOWon indicating that the low-speed gear position of the speed change device 83 is selected by the vehicle driver; and an output signal of a vehicle weight sensor 124 indicative of a vehicle weight WTv that is a weight of the vehicle 8.

The above-described differential-lock selection switch 120 and low-gear selection switch 122 are provided in vicinity of a driver seat of the vehicle 8. The differential-lock selection switch 120 is a switch that is to be placed in its ON state by the vehicle driver when the differential device 64 is to be placed in the differential lock state in the transfer 28. The low-gear selection switch 122 is a switch that is to be placed in its ON state by the vehicle driver when the speed change device 83 is to be placed in the low-speed gear position during the "H4_Lock" mode established in the transfer 28.

The electronic control device 130 generates various output signals to the various devices provided in the vehicle 8, such as: an engine control command signal Se that is to be supplied to the engine control device 20 for controlling the engine 12; an MGM control command signal Smgm that is to be supplied to the inverter 22 for controlling the TM rotary electric machine MGM; an MGF control command signal Smgf that is to be supplied to the inverter 22 for controlling the TF rotary electric machine MGF; a hydraulic command signal Slu that is to be supplied to the hydraulic control unit 60 for controlling the controlled state of the lockup clutch LU; a hydraulic command signal Sat that is to be supplied to the hydraulic control unit 60 for controlling the controlled state of each of the engagement devices CB so as to control the automatic transmission 50; a hydraulic command signal Scbf that is to be supplied to the hydraulic control unit 60 for controlling the controlled state of each of the TF clutch CF1 and the TF brake BF1 so as to control the transfer 28; a transfer control command signal Stf that is to be supplied to the switch actuator 82 for operating the first and second dog clutches D1, D2 so as to control the transfer 28; an EOP control command signal Seop that is to be supplied to the pump motor 88 for controlling the EOP 86; a brake control command signal Sb that is to be supplied to a wheel brake device 126 for controlling a braking force generated by each wheel brake; and an information-notification control command signal Sinf that is to be supplied to an information notification device 128 for notifying various information to the vehicle driver.

For performing various control operations in the vehicle driving apparatus 10, the electronic control device 130 includes a shift control means in the form of a transmission control portion 132, a hybrid control means in the form of a hybrid control portion 134 and a drive-state control means in the form of a drive-state control portion 136.

Figure 7:
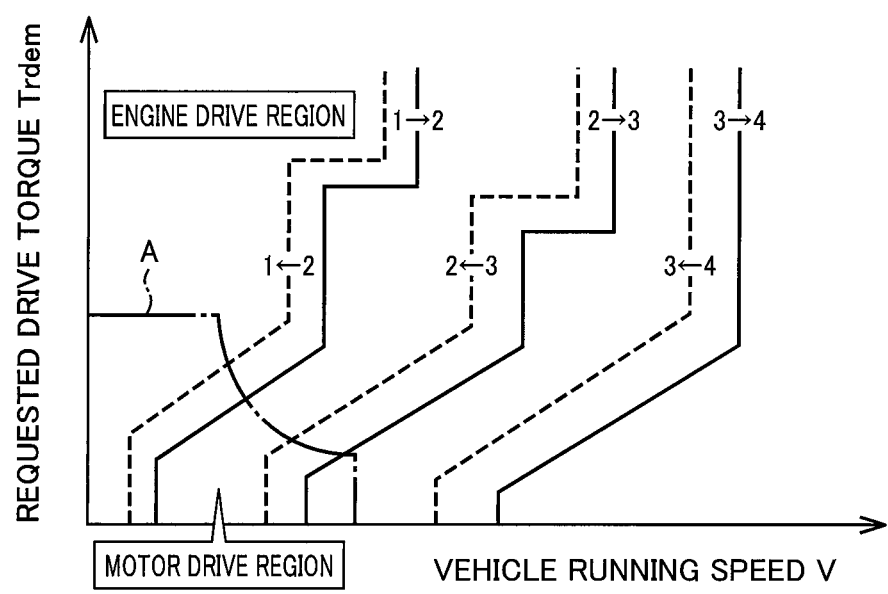
FIG. 7 is a view showing, by way of examples, an AT-gear-position shifting map used for controlling gear shifting in the automatic transmission, a driving-mode switching map used for switching a driving mode, and a relationship between the shifting map and the driving-mode switching map.

The transmission control portion 132 determines whether a shifting action is to be executed in the automatic transmission 50, by using an AT-gear-position shifting map shown in FIG. 7, for example, and outputs the hydraulic command signal Sat, as needed, which is supplied to the hydraulic control unit 60, for executing the shifting action in the automatic transmission 50. The AT-gear-position shifting map represents a predetermined relationship, i.e., a pre-stored relationship obtained by experimentation or determined by an appropriate design theory. In the AT-gear-position shifting map, the predetermined relationship is represented by shifting lines in two-dimensional coordinates in which the vehicle running speed V and a requested drive torque Trdem as two variables are taken along respective two axes, wherein the shifting lines are used for the determination as to whether the shifting action is to be executed in the automatic transmission 50. In the AT-gear-position shifting map, one of the two variables may be the AT output rotational speed No in place of the vehicle running speed V, and the other of the two variables may be any one of a requested drive force Frdem, the accelerator opening degree θacc and the throttle opening degree θth in place of the requested drive torque Trdem. The above-described shifting lines in the AT-gear-position shifting map consist of shift-up lines (indicated by solid lines in FIG. 7) for determining a shift-up action of the automatic transmission 50, and shift-down lines (indicated by broken lines in FIG. 7) for determining a shift-down action of the automatic transmission 50.

The hybrid control portion 134 has a function serving as an engine control means or portion 134a for controlling the operation of the engine 12 and a function serving as a rotating-machine control means or portion 134b for controlling the operations of the TM rotary electric machine MGM and the TF rotary electric machine MGF through the inverter 22, and executes a hybrid drive control, for example, using the engine 12, TM rotary electric machine MGM and TF rotary electric machine MGF through these control functions.

The hybrid control portion 134 calculates a drive request amount DEM requested to the vehicle 8 by the vehicle driver, by applying the accelerator opening degree θacc and the vehicle running speed V to, for example, a drive request amount map that is a predetermined relationship. The drive request amount DEM is, for example, the requested drive torque Trdem [Nm] that is to be applied to the drive wheels DW. The requested drive force Frdem [N] applied to the drive wheels DW, a requested drive power Prdem [W] applied to the drive wheels DW or a requested AT output torque applied to the transmission output shaft 54, for example, can be used as the drive request amount DEM, in addition to or in place of the requested drive torque Trdem. From another point of view, the requested drive torque Trdem corresponds to the requested drive power Prdem at a speed value of the vehicle running speed V upon output of a command signal. In calculation of the drive request amount DEM, the TF output rotational speed Nof may be used in place of the vehicle running speed V.

The hybrid control portion 134 outputs the engine control command signal Se, MGM control command signal Smgm and MGF control command signal Smgf for controlling the engine 12, TM rotary electric machine MGM and TF rotary electric machine MGF, respectively, such that the requested drive power Prdem is realized, by taking account of various factors such as a transmission loss, an auxiliary load, the gear ratio γat of the automatic transmission 50 and a maximum chargeable amount Win and a maximum dischargeable amount Wout of the battery 24. The engine control command signal Se is, for example, a command value for realizing a requested engine power Pedem that is a requested value of an engine power Pe for outputting the engine torque Te at a speed value of the engine rotational speed Ne upon output of the engine control command signal Se. The engine power Pe is an output [W] of the engine 12, i.e., a power of the engine 12. The MGM control command signal Smgm is, for example, a command value of a consumed electric power Wcmgm or a generated electric power Wgmgm of the TM rotary electric machine MGM for outputting the MGM torque Tmgm at a speed value of the MGM rotational speed Nmgm upon output of the MGM control command signal Smgm. The MGF control command signal Smgf is, for example, a command value of a consumed electric power Wcmgf or a generated electric power Wgmgf of the TF rotary electric machine MGF for outputting the MGF torque Tmgf at a speed value of the MGF rotational speed Nmgf upon output of the MGF control command signal Smgf.

The maximum chargeable amount Win of the battery 24 is a maximum amount of the electric power that can be charged to the battery 24, and indicates an input limit of the battery 24. The maximum dischargeable amount Wout of the battery 24 is a maximum amount of the electric power that can be discharged from the battery 24, and indicates an output limit of the battery 24. The maximum chargeable and dischargeable amounts Win, Wout are calculated by the electronic control device 130, for example, based on a battery temperature THbat and a charged state value SOC [%] of the battery 24 that corresponds to a stored electric energy amount (charged electric energy amount) of the battery 24. The charged state value SOC of the battery 24 is a value indicative of a charged state of the battery 24, and is calculated by the electronic control device 130, for example, based on the charging/discharging electric current Ibat and the voltage Vbat of the battery 24.

The hybrid control portion 134 establishes a BEV driving mode as a driving mode for driving the vehicle 8 when the requested drive power Prdem is in a motor drive region smaller than a predetermined threshold speed value, and establishes an HEV driving mode as the driving mode when the requested drive power Prdem is in an engine drive region not smaller than the predetermined threshold speed value. The BEV driving mode is a motor driving mode in which a BEV running of the vehicle 8 can be performed with use of the TF rotary electric machine MGF as the second power source PU2 and with operation of the first power source PU1 being stopped. The HEV driving mode is a hybrid driving mode in which an engine running of the vehicle 8 can be performed with use of at least the engine 12 as the first power source PU1. In FIG. 7, one-dot chain line A is a boundary line between the engine drive region and the motor drive region, for switching between the BEV driving mode and the HEV driving mode. A predetermined relationship having the boundary line as indicated by the one-dot chain line A of FIG. 7 is an example of a driving-mode switching map defined by two-dimensional coordinates of variables in the form of the vehicle running speed V and the requested drive torque Trdem. It is noted that, in FIG. 7, the driving-mode switching map is shown together with the AT-gear-position shifting map, for convenience of the description.

Even when the requested drive power Prdem is in the motor drive region, the hybrid control portion 134 establishes the HEV driving mode, for example, in a case in which the charged state value SOC of the battery 24 becomes less than a predetermined engine-start threshold speed value or in a case in which the engine 12 needs to be warmed up. From another point of view, the motor drive region disappears in the case in which the charged state value SOC becomes less than the engine-start threshold speed value or in the case in which the engine 12 needs to be warmed up. The engine-start threshold speed value is a predetermined threshold speed value for determining that the charged state value SOC reaches a level at which the battery 24 needs to be charged by automatically starting the engine 12.

The drive-state control portion 136 determines one of the modes (see FIG. 6) that is to be established in the transfer 28, based on various factors such as the vehicle running speed V, accelerator opening degree θacc, brake ON signal Bon, shift operation position POSsh, longitudinal acceleration Gx, lateral acceleration Gy, yaw rate Ryaw, steering angle θsw, steering direction Dsw, lock-mode ON signal LOCKon and low-gear ON signal LOWon, and outputs various control command signals required for establishing the determined one of the modes. The various control command signals include the hydraulic command signal Scbf for the TF clutch CF1 and TF brake BF1 and the transfer control command signal Stf for the first and second dog clutches D1, D2.

During the BEV driving mode, the drive-state control portion 136 establishes the low-speed gear position in the speed change device 83 by placing the TF brake BF1 and the TF clutch CF1 in the engaged state and the released state, respectively, when the vehicle running speed V is in a relatively low speed range, and establishes the high-speed gear position in the speed change device 83 by placing the TF brake BF1 and the TF clutch CF1 in the released state and the engaged state, respectively, when the vehicle running speed V is in a relatively high speed range. During the BEV driving mode, the drive-state control portion 136 establishes the low-speed gear position in the speed change device 83 in a relatively high drive requested region, and establishes the high-speed gear position in the speed change device 83 in a relatively low drive requested region. That is, during the BEV driving mode, the drive-state control portion 136 establishes the "EV (FF) LOW" mode in the relatively low speed range or in the relatively-high-drive requested region, and establishes "EV (FF) HIGH" mode in the relatively high speed range or in the relatively-high-drive requested region. The drive-state control portion 136 controls the gear ratio of the speed change device 83, depending on the vehicle running speed V and/or the drive request amount DEM (e.g., requested drive torque Trdem).

In each of the "H4_TORQUE SPLIT" mode and the "H4_LSD" mode, the drive-state control portion 136 determines a running state of the vehicle 8, based on the output signals of various sensors such as the vehicle speed sensor 98, acceleration sensor 110 and yaw rate sensor 112, and sets a target value of a torque distribution ratio Rx that is dependent on the determined running state of the vehicle 8. The torque distribution ratio Rx is a ratio of distribution of the torque of the power sources PU, between the front wheels 14 and the rear wheels 16. The torque distribution ratio Rx may be represented by a rear-wheel-side distribution ratio Xr that is a ratio of the torque transmitted to the rear wheels 16 from the power sources PU, to the total toque transmitted to the front and rear wheels 14, 16 from the power sources PU. Alternatively, the torque distribution ratio Rx may be represented by a front-wheel-side distribution ratio Xf (=1-Xr) that is a ratio of the torque transmitted to the front wheels 14 from the power sources PU, to the total toque transmitted to the front and rear wheels 14, 16 from the power sources PU.

In the "H4_TORQUE SPLIT" mode, the drive-state control portion 136 outputs the MGF control command signal Smgf for controlling the TF rotary electric machine MGF such that the rear-wheel-side distribution ratio Xr becomes the target value by adjusting the MGF torque Tmgf of the TF rotary electric machine MGF serving as the above-described reaction torque (that is applied to the sun gear S of the differential device 64). With increase of the MGF torque Tmgf, the rear-wheel-side distribution ratio Xr is reduced, namely, the front-wheel-side distribution ratio Xf is increased. In the "H4_LSD" mode, the drive-state control portion 136 outputs the hydraulic command signal Scbf for controlling the slipping state of the TF clutch CF1 such that the rear-wheel-side distribution ratio Xr becomes the target value by adjusting the torque capacity of the TF clutch CF1. With increase of the torque capacity of the TF clutch CF1, the rear-wheel-side distribution ratio Xr is reduced.

The drive-state control portion 136 establishes the "H4_Lock" mode, when the differential-lock selection switch 120 is placed into the ON state by the vehicle driver in the "H4_TORQUE SPLIT" mode or the "H4_LSD" mode. The drive-state control portion 136 establishes the "L4_Lock" mode, when the low-gear selection switch 122 is placed into the ON state by the vehicle driver in the "H4_Lock" mode during stop of the vehicle 8.

There will be described, with reference to FIG. 8, an engine operation point PNTeng that can be changed in the vehicle driving apparatus 10, as in a continuously-variable transmission. The engine operation point PNTeng is a driving point or an operation point of the engine 12, which is represented by a combination of the engine rotational speed Ne and the engine torque Te.

Figure 8:
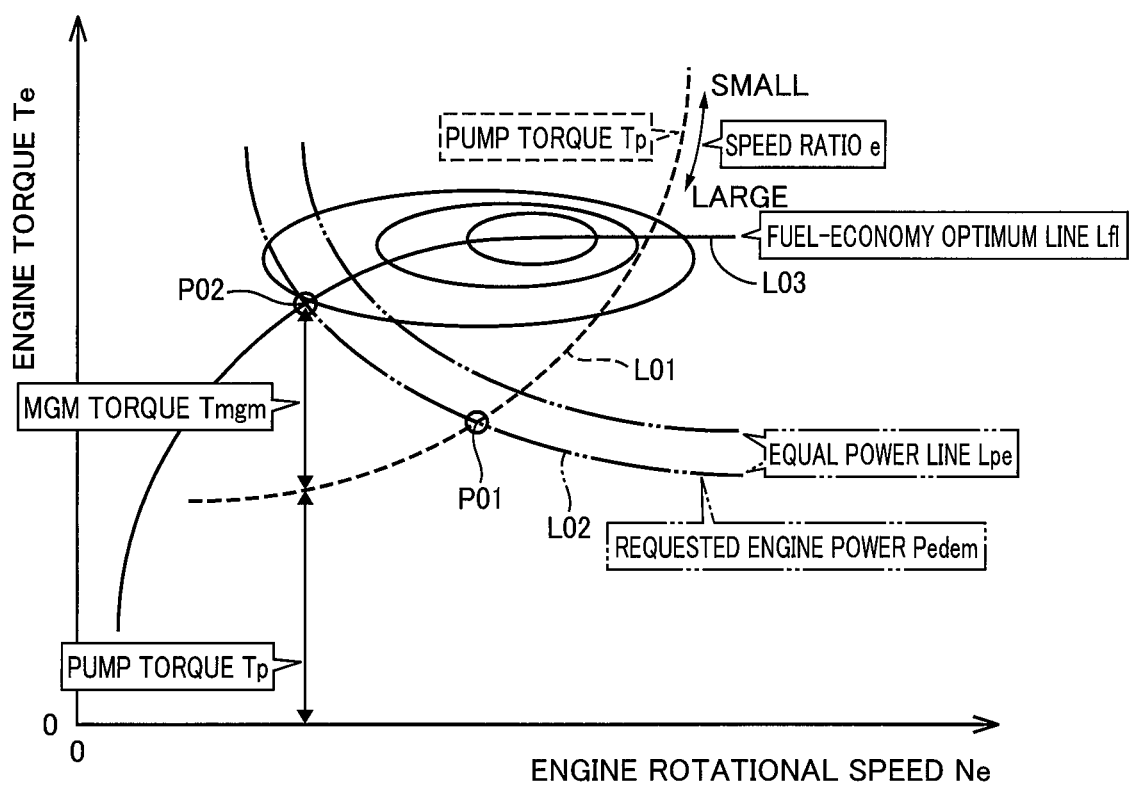
FIG. 8 is a view for explaining that an engine operation point can be changed as in a continuously-variable transmission, in the vehicle driving apparatus.

In FIG. 8, each of equal power lines Lope, which are indicated by two-dot chain lines, represents an example of the requested engine power Pedem that realizes the requested drive power Prdem calculated based on, for example, the accelerator opening degree θacc. The requested engine power Pedem is the engine power Pe requested by the accelerating operation or other operation made by the vehicle driver. On the other hand, a broken line LOW represents an example of a pump torque Top that is a torque generated in the pump impeller 48a depending on a speed ratio e (=Nt/Np) of the torque converter 48, in two-dimensional coordinates in which the engine rotational speed Ne and the engine torque Te as two variables are taken along respective two axes, for convenience of description. A pump rotational speed Np is a rotational speed of the pump impeller 48a, and is equal to the engine rotational speed Ne. Under a constant value of the turbine rotational speed Nt, the pump torque Top represented by the broken line LOW has a relationship with the engine rotational speed Ne, which is dependent on a hardware construction. When the requested engine power Pedem corresponds to one of the equal power lines Lpe that is indicated by a two-dot chain line L02, for example, the engine operation point PNTeng is naturally set to a so-called coupling point P01 at which the broken line L01 and the two-dot chain line L02 intersect with each other.

The engine operation point PNTeng can be shifted or changed from the coupling point P01 to a fuel-economy optimum point P02 lying on a fuel-economy optimum line Lf1 (indicated by solid line L03), while being kept on the above-described one of the equal power lines Lpe that corresponds to the requested engine power Pedem, for example, by using a part of the engine power Pe to cause the TM rotary electric machine MGM to perform a power generation. The fuel-economy optimum line Lf1 is a predetermined operation curve representing combinations between values of the engine rotational speed Ne and the engine torque Te, which cooperate with each other to maximize the fuel economy of the engine 12. That is, the fuel-economy optimum line Lf1 consists of a succession of predetermined fuel-economy optimum points each of which is an optimum engine operation point PNTeng for improving the fuel economy of the engine 12. In the vehicle driving apparatus 10, it is possible to change the engine operation point PNTeng arbitrarily without being constrained by the turbine rotation speed Nt, by adjusting the MGM torque Tmgm such that a sum of the engine torque Te and the MGM torque Tmgm is balanced with the pump torque Tp, namely, such that a relationship represented by an equation "Tp=Te+Tmgm (that is a negative value in FIG. 8)" is established. When the MGM torque Tmgm is a negative value, namely, when the TM rotary electric machine MGM is caused to perform the power generation, the electric power generated by the TM rotary electric machine MGM is basically supplied to the TF rotary electric machine MGF and is converted into the mechanical power by the TF rotary electric machine MGF. The vehicle driving apparatus 10 has an electrical path and a mechanical path as power transmission paths of the engine power Pe, wherein the electrical path is a path through which the electric power is to be transmitted or transferred between the TM rotary electric machine MGM and the TF rotary electric machine MGF, while the mechanical path is a path through which the mechanical path is to be transmitted or transferred via the torque converter 48. In the vehicle driving apparatus 10, an electrically-operated continuously-variable transmission is formed with use of the TM rotary electric machine MGM and the TF rotary electric machine MGF.

The hybrid control portion 134 controls the engine operation point PNTeng by adjusting an electrical path amount Ppse [W] that is an amount of the electric power in the electrical path through which the electric power is to be transferred between the TM rotary electric machine MGM and the TF rotary electric machine MGF. The electrical path amount Ppse is, for example, a product of the MGM torque Tmgm and the MGM rotational speed Nmgm.

The hybrid control portion 134 obtains a target electrical path amount Ppsetgt as a target value of the electrical path amount Ppse by which the engine operation point PNTeng is caused to become a target operation point PNTtgt. The target operation point PNTtgt is, for example, the above-described fuel-economy optimum point, and is the fuel-economy optimum point P02 (see FIG. 8) when the requested engine power Pedem corresponds to the two-dot chain line L02. The target electrical path amount Ppsetg is a product of the MGM torque Tmgm, which is required to change the engine operation point PNTeng from the coupling point to the fuel-economy optimum point, and the engine rotational speed Ne, i.e., the MGM rotational speed Nmgm, at the fuel-economy optimum point. The hybrid control portion 134 drives the TF rotary electric machine MGF while controlling the MGM torque Tmgm such that the electrical path amount Ppse, which is the amount of the electric power transferred from the TM rotary electric machine MGM to the TF rotary electric machine MGF through the electrical path, becomes the target electrical path amount Ppsetgt. Owing to this arrangement, it is possible to improve a combustion efficiency of the engine 12 while maintaining the same engine power Pe, so that the fuel economy of the engine 12 can be improved.

By the way, for example, even when the requested drive power Prdem is in the motor drive region, in a case in which the TF rotary electric machine MGF is stopped or is rotated at an extremely low speed so as to be placed in a so-called single-phase lock state, namely, a state in which an electric current continues flowing through the rotary electric machine that is in a certain phase, if the flowing electric current is large, electric equipment such as the TF rotary electric machine MGF and the inverter 22 could be overheated whereby durabilities of the TF rotary electric machine MGF and the inverter 22 could be reduced. For example, when the vehicle 8 is on an uphill road or when riding on a step in the BEV driving mode, the requested drive torque Trdem is increased with the vehicle 8 being stopped or running at an extremely low speed, whereby the large electric current is caused to flow through the TF rotary electric machine MGF that is placed in the single-phase lock state, so that there is a possibility that the equipment such as the TF rotary electric machine MGF could be overheated and accordingly the durability could be reduced.

In view of such a possible problem, when the TF rotary electric machine MGF is placed in the single-phase lock state in the BEV driving mode, the electronic control device 130 causes the TF rotary electric machine MGF to take charge of a part of the drive request amount DEM that corresponds to the threshold amount value DEMf and causes the first power source PUT to take charge of another part of the drive request amount DEM that exceeds the threshold amount value DEMf.

Specifically, when the vehicle 8 is stopped or running at the extremely low speed that is not higher than a threshold speed value Vf, with the BEV driving mode being established as the driving mode, the control device 130 is configured, upon determination that the drive request amount DEM requested to the vehicle 8 is larger than the threshold amount value DEMf, to place the lockup clutch LU into its engaged state and to place the first power transmission path PT1 into a power transmittable state so as to cause the power of the first power source PUT to be outputted to the first output shaft 66. The threshold speed value Vf is a predetermined upper limit value of the vehicle running speed V, which is predetermined, for example, such that it is considered that the TF rotary electric machine MGF is in the single-phase lock state when the vehicle running speed V is not higher than the threshold speed value Vf. The threshold amount value DEMf is a predetermined threshold value for determining, when the drive request amount DEM is larger than the threshold amount value DEMf, that the electric current caused to flow through the TF rotary electric machine MGF is large enough to cause the equipment such as the TF rotary electric machine MGF and the inverter 22 to be problematically overheated. When the drive request amount DEM is represented by the requested drive torque Trdem, it is determined whether the requested drive torque Trdem is larger than a threshold torque value TA or not.

More specifically described, the hybrid control portion 134 determines whether the BEV driving mode is established as the driving mode or not. Particularly, a situation that is likely to cause the equipment such as the TF rotary electric machine MGF and the inverter 22 to be overheated, is when the requested drive torque Trdem, for example, during running of the vehicle 8 in the "EV (FF) LOW" mode. From another point of view, even in the "EV (FF) LOW" mode in which the MGF torque Tmgf required for realizing the requested drive torque Trdem is smaller than in "EV (FF) HIGH" mode, it is determined whether the equipment such as the TF rotary electric machine MGF and the inverter 22 could be problematically overheated or not. When the drive request amount DEM is larger than the threshold amount value DEMf, the speed change device 83 is placed in the low-speed gear position. That is, when the drive request amount DEM is larger than the threshold amount value DEMf, the gear ratio of the speed change device 83 is set to a higher value within a controllable gear ratio range, namely, the gear ratio of the speed change device 83 is made higher than when the drive request amount DEM is not larger than the threshold amount value DEMf. In the present embodiment, the hybrid control portion 134 determines whether the "EV (FF) LOW" mode is established as the driving mode or not.

When determining that the "EV (FF) LOW" mode is established, the hybrid control portion 134 determines whether the vehicle 8 is stopped or running at the extremely low speed that is not higher than the threshold speed value Vf.

When determining that the "EV (FF) LOW" mode is established as the driving mode and that the vehicle 8 is stopped or running at the extremely low speed not higher than the threshold speed value Vf, the hybrid control portion 134 determines whether the requested drive torque Trdem is larger than the threshold torque value TA or not. The threshold torque value TA is a predetermined threshold value for determining, when the requested drive torque Trdem is larger than the threshold torque value TA, that the electric current caused to flow through the TF rotary electric machine MGF is large enough to cause the equipment such as the TF rotary electric machine MGF to be problematically overheated, even if the speed change device 83 is placed in the low-speed gear position.

When it is determined by the hybrid control portion 134 that the "EV (FF) LOW" mode is established as the driving mode, that the vehicle 8 is stopped or running at the extremely low speed not higher than the threshold speed value Vf and that the requested drive torque Trdem is larger than the threshold torque value TA, the transmission control portion 132 places the lockup clutch LU into the engaged state, i.e., the lockup state, and places the first power transmission path PT1 into the power transmittable state by placing the automatic transmission 50 into the AT1-speed gear position.

When determining that the "EV (FF) LOW" mode is established as the driving mode, that the vehicle 8 is stopped or running at the extremely low speed not higher than the threshold speed value Vf and that the requested drive torque Trdem is larger than the threshold torque value TA, the hybrid control portion 134 causes the TF rotary electric machine MGF to output the MGF torque Tmgf that realizes the threshold torque value TA, and executes a torque assisting control for causing the first power source PU1 to output a compensating torque for compensating the insufficiency of the MGF torque Tmgf, so as to realize the requested drive torque Trdem, wherein the compensating torque corresponds to a torque assisting amount Tasist. For example, the torque assisting amount Tasist is a torque value acting on the connection shaft 46, for enabling the MGF torque Tmgf to be reduced so as not to be in a torque range that could cause the equipment such as the TF rotary electric machine MGF to be problematically overheated. The torque assisting amount Tasist is calculated in accordance with a relationship or expression (1) given below, where "Treq" represents a requested torque that is a converted value of the requested drive torque Trdem converted on the connection shaft 46, "Tlock" represents a single-phase lock torque that is a converted value of the threshold torque value TA converted on the connection shaft 46, and "Ty" represents a margin amount that is a converted value of a margin torque amount (including a variation) converted on the connection shaft 46. The power of the TF rotary electric machine MGF is transmitted to the front wheels 14 while the power of the first power source PU1 is transmitted to the rear wheels 16, so that it is possible to keep a torque balance between the pair of front wheels 14 and the pair of rear wheels 16.

$$Tasist = Treq - Tlock + Ty \quad (1)$$

When the vehicle 8 is running with deceleration with the BEV driving mode being established as the driving mode, a need for the AWD is low. Therefore, when the BEV driving mode is established as the driving mode and the vehicle 8 is running with deceleration, the drive-state control portion 136 places the second dog clutch D2 into the disconnection state (first state [1]). With the second dog clutch D2 being placed into the disconnection state, for example, the "EV (FF) LOW" mode can be easily switched to another driving mode.

Figure 9:
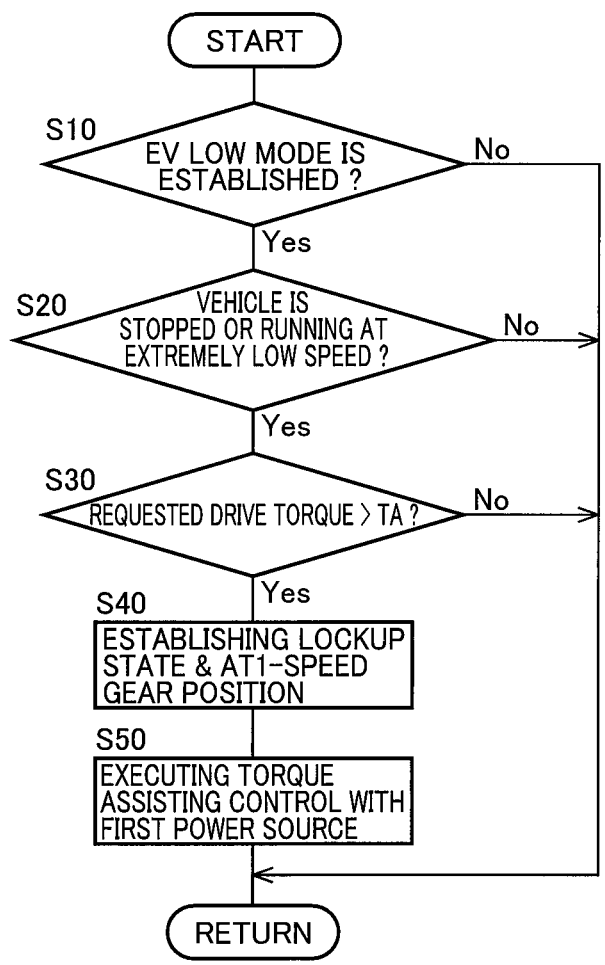
FIG. 9 is a flow chart showing a main part of a control routine that is to be executed by an electronic control device, for suppressing overheating of equipment such as a TF rotary electric machine MGF in a BEV driving mode.

FIG. 9 is a flow chart showing a main part of a control routine that is to be executed by the electronic control device 130, for suppressing overheating of the equipment such as the TF rotary electric machine MGF in the BEV driving mode. This control routine is executed, for example, in a repeated manner.

As shown in FIG. 9, the control routine is initiated with step S10 corresponding to function of the hybrid control portion 134, which is implemented to determine whether the "EV (FF) LOW" mode is established or not. When a negative determination is made at step S10, one cycle of execution of the control routine is terminated. When an affirmative determination is made at step S10, step S20 corresponding to function of the hybrid control portion 134 is implemented to determine whether the vehicle 8 is stopped or running at the extremely low speed not higher than the threshold speed value Vf. When a negative determination is made at step S20, one cycle of execution of the control routine is terminated. When an affirmative determination is made at step S20, step S30 corresponding to function of the hybrid control portion 134 is implemented to determine whether the requested drive torque Trdem is larger than the threshold torque value TA or not. When a negative determination is made at step S30, one cycle of execution of the control routine is terminated. When an affirmative determination is made at step S30, step S40 corresponding to function of the transmission control portion 132 is implemented to place the torque converter 48 into the lockup state and to place the automatic transmission 50 into the AT1-speed gear position. Step S40 is followed by step S50 corresponding to function of the hybrid control portion 134, which is implemented to cause the TF rotary electric machine MGF to output the MGF torque Tmgf for realizing the threshold torque value TA, and to execute the torque assisting control using the first power source PU1.

As described above, in the present embodiment, when the vehicle 8 is stopped or running at the extremely low speed not higher than the threshold speed value Vf, with the BEV driving mode being established as the driving mode, the electronic control device 130 is configured, upon determination that the drive request amount DEM requested to the vehicle 8 is larger than the threshold amount value DEMf, to place the lockup clutch LU into the engaged state and to place the first power transmission path PT1 into the power transmittable state so as to cause the power of the first power source PU1 to be outputted to the first output shaft 66, thereby making it possible to reduce the MGF torque Tmgf that is to be outputted by the TF rotary electric machine MGF and accordingly to suppress overheating of the equipment such as the TF rotary electric machine MGF. Moreover, since the lockup clutch LU is placed in the engaged state, it is also possible to suppress loss of the power in the torque converter 48.

In the present embodiment, the electronic control device 130 is configured to control the gear ratio of the speed change device 83, depending on the drive request amount DEM, such that the gear ratio of the speed change device 83 is higher when the drive request amount DEM is larger than the threshold amount value DEMf, than when the drive request amount DEM is not larger than the threshold amount value DEMf. Thus, the MGF torque Tmgf that is to be outputted by the TF rotary electric machine MGF can be reduced by also the speed change device 83.

In the present embodiment, the speed change device 83 includes the differential device 64, the TF clutch CF1 and the TF brake BF1. Thus, the speed change device 83 as the second transmission device can be constituted to include the differential device 64.

In the present embodiment, the transfer 28 includes the second dog clutch D2 that is to be placed in a selected one of the first connection state, the second connection state and the disconnection state, wherein the electronic control device 130 is configured to place the second dog clutch D2 in the disconnection state, when the vehicle 8 is running with deceleration with the BEV driving mode being established as the driving mode. It is therefore possible to easily switch the BEV driving mode to another mode during the running of the vehicle 8 with deceleration.

In the present embodiment, the first output shaft 66 is another rotary element which is other than the first, second and third rotary elements of the differential device 64 and which is configured to receive the power of the first power source PUT. It is therefore possible to cause the power of the first power source PUT to be outputted to the drive wheels DW without via the differential device 64, and accordingly to reduce drag of the differential device 64.

There will be described other embodiments of this invention. The same reference signs as used in the above-described first embodiment will be used in the following embodiment, to identify the functionally corresponding elements, and descriptions thereof are not provided.

Second Embodiment

Figure 10:
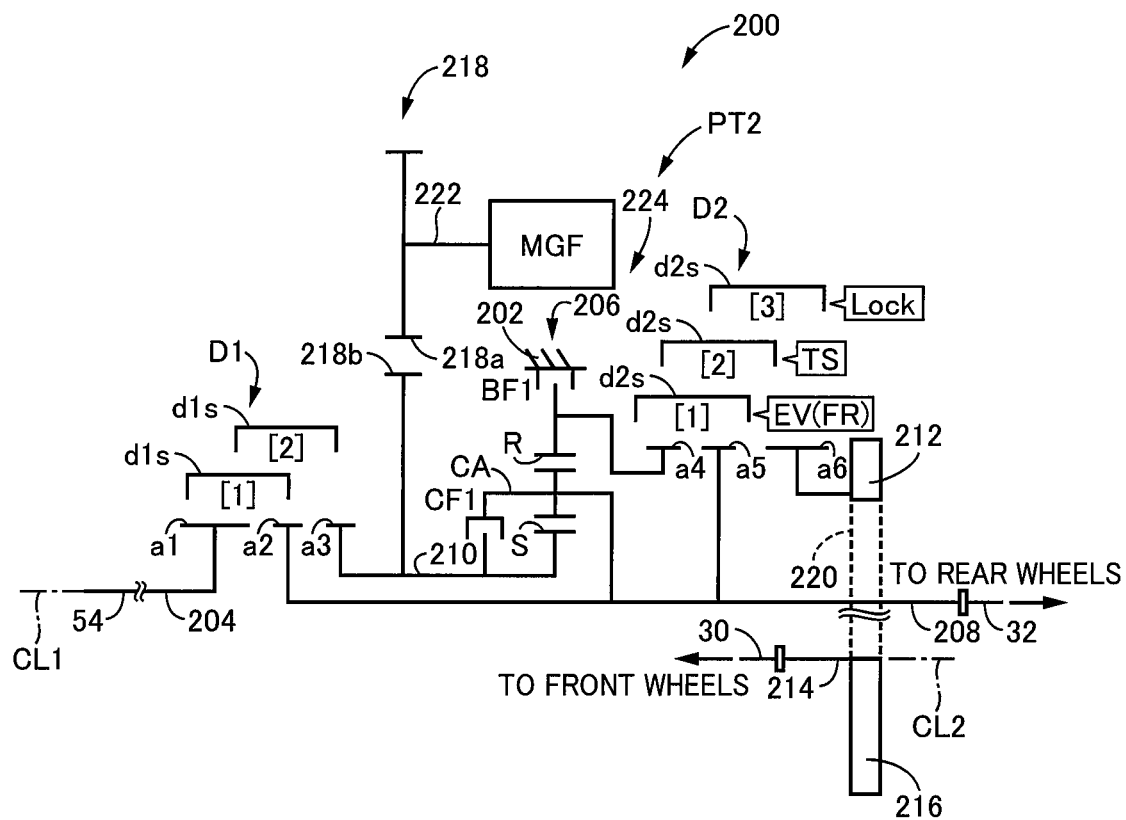
FIG. 10 is a view schematically showing a construction of a transfer that is other than the transfer of FIG. 4.

FIG. 10 is a view schematically showing a construction of a transfer 200 that is other than the transfer 28 of FIG. 4. Like the transfer 28, the transfer 200 serves as the torque distribution device, and the vehicle driving apparatus 10 is provided with the transfer 200 in place of the transfer 28 in this second embodiment. As shown in FIG. 10, the transfer 200 includes a transfer cause 202 as a non-rotary member, a TF input shaft 204, a differential device 206, the TF clutch CF1, the TF brake BF1, a first output shaft 208, an intermediate shaft 210, the first dog clutch D1, the second dog clutch D2 and a drive gear 212. The TF input shaft 204, differential device 206, TF clutch CF1, TF brake BF1, first output shaft 208, intermediate shaft 210, first dog clutch D1, second dog clutch D2 and drive gear 212 are provided inside the transfer case 202, and are disposed on a common axis in the form of a rotation axis CS1. Each of the differential device 206, TF clutch CF1, TF brake BF1, intermediate shaft 210, first and second dog clutches D1, D2 and drive gear 212 is constructed substantially symmetrically about the rotation axis CL1, so that its lower half (that is located on a lower side of the rotation axis CL1) is not shown in FIG. 10.

The transfer 200 further includes a second output shaft 214 and a driven gear 216 which are provided inside the transfer case 202 and which are disposed on a common axis in the form of a rotation axis CL2. The driven gear 216 is constructed substantially symmetrically about the rotation axis CL2, so that its upper half (that is located on an upper side of the rotation axis CL2) is not shown in FIG. 10. The rotation axis CL2 corresponds to an axis of the second output shaft 214, for example.

The transfer 200 further includes the TF rotary electric machine MGF, a pair of connection gears 218 and a chain 220 that are provided inside the transfer case 202. The pair of connection gears 218 consists of a TF rotary-electric-machine connection gear 218*a* that is to be rotated integrally with a rotor shaft 222 of the TF rotary electric machine MGF, and a TF counter gear 218*b* that constantly meshes with the TF rotary-electric-machine connection gear 218*a*. The chain 220 is provided to connect between the drive gear 212 and the driven gear 216.

Like the transfer 28 of FIG. 4, the transfer 200 further includes a switch actuator (not shown) fixed to the transfer case 202, so as to operate the first and second dog clutches D1, D2. The first sleeve d1*s* of the first dog clutch D1 is to be moved by the switch actuator in the direction of the rotation axis CL1. The second sleeve d2*s* of the second dog clutch D2 is to be moved by the switch actuator in the direction of the rotation axis CL1.

The TF input shaft 204 is connected to the transmission output shaft 54 in a power transmittable manner. The first output shaft 208 is connected to the rear propeller shaft 32 in a power transmittable manner. The second output shaft 214 is connected to the front propeller shaft 30 in a power transmittable manner. The driven gear 216 is connected to the second output shaft 214, unrotatably relative to the second output shaft 214. The TF counter gear 218*b* is connected to the intermediate shaft 210, unrotatably relative to the intermediate shaft 210.

The differential device 206 is constituted by a single-pinion-type planetary gear device, and includes a sun gear S, a carrier CA and a ring gear R. The sun gear S is fixed to the intermediate shaft 210, unrotatably relative to the intermediate shaft 210, so that the TF rotary electric machine MGF is connected to the sun gear S via the pair of connection gears 218. The carrier CA is connected to the first output shaft 208, unrotatably relative to the first output shaft 208. The ring gear R is selectively connected to the transfer case 202 via the TF brake BFT. The sun gear S and the carrier CA are selectively connected to each other via the TF clutch CFT.

The first dog teeth a1 of the first dog clutch D1 is fixed to the TF input shaft 204, unrotatably relative to the TF input shaft 204. The second dog teeth a2 of the first dog clutch D1 is fixed to the first output shaft 208, unrotatably relative to the first output shaft 208. The third dog teeth a3 of the first dog clutch D1 is fixed to the intermediate shaft 210, unrotatably relative to the intermediate shaft 210. It is noted that FIG. 10 shows the first sleeve d1*s* of the first dog clutch D1 when the first sleeve d1*s* is placed in each of the first state [1] and the second state [2], for convenience of description.

The fourth dog teeth a4 of the second dog clutch D2 is connected to the ring gear R. The fifth dog teeth a5 of the second dog clutch D2 is connected to the first output shaft 208, unrotatably relative to the first output shaft 208. The sixth dog teeth a6 of the second dog clutch D2 is connected to the drive gear 212. It is noted that FIG. 10 shows the second sleeve d2*s* of the second dog clutch D2 when the second sleeve d2*s* is placed in each of the first state [1], second state [2] and third state [3], for convenience of description.

In the transfer 200, the second output shaft 214 is connected to the ring gear R via the second dog clutch D2 when the second dog clutch D2 is in the second state [2], and is connected to the first output shaft 208 via the second dog clutch D2 when the second dog clutch D2 is in the third state [3]. The second state [2] of the second dog clutch D2 corresponds to a first connection state in which the second output shaft 214 is connected to the ring gear R. The third state [3] of the second dog clutch D2 corresponds to a second connection state in which the second output shaft 214 is connected to the first output shaft 208. The first state [1] of the second dog clutch D2 corresponds to a disconnection state in which the second output shaft 214 is connected to neither the ring gear R nor the first output shaft 208.

Figure 11:
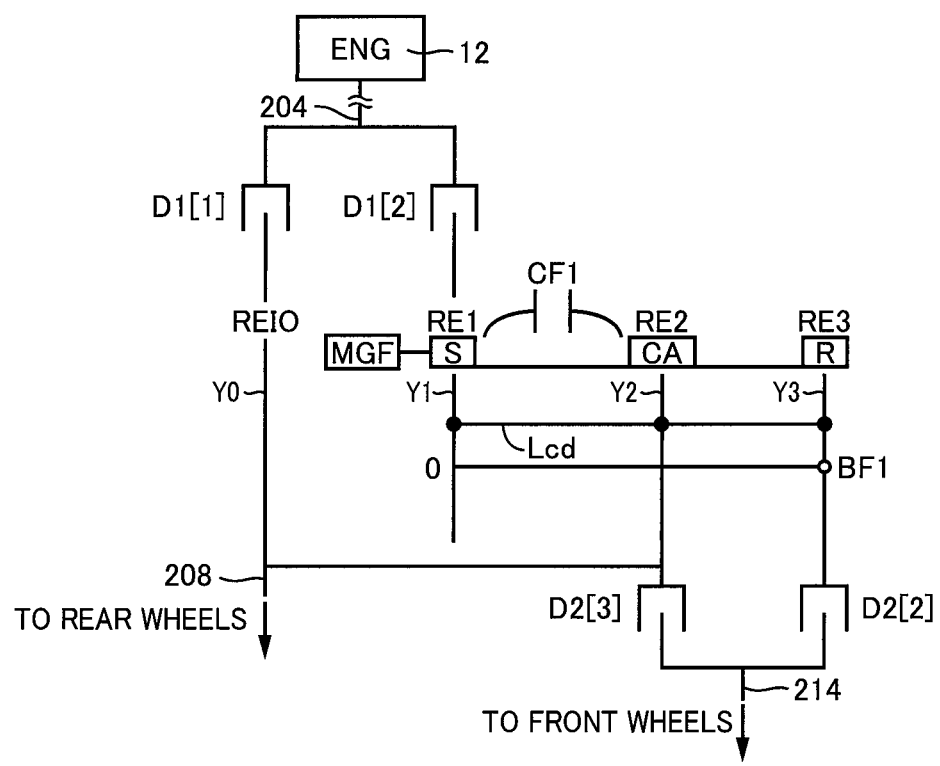
FIG. 11 is a collinear chart indicating a relationship among rotational speeds of rotary elements of the transfer of FIG. 10.

FIG. 11 is a collinear chart indicating a relationship among rotational speeds of rotary elements of the transfer 200. In FIG. 11, three vertical lines Y1, Y2, Y3 corresponding to the three rotary elements of the differential device 206 constituting the transfer 200 are an axis representative of a rotational speed of the sun gear S corresponding to the first rotary element RE1, an axis representative of a rotational speed of the carrier CA corresponding to the second rotary element RE2, and an axis representative of a rotational speed of the ring gear R corresponding to the third rotary element RE3, in order from the left side. Further, in FIG. 11, a vertical line Y0, which is located on a left side of the vertical line YT, is an axis representative of a rotational speed of the first output shaft 208 corresponding to the input/output rotary element REIO that is the rotary element other than the three rotary elements of the differential device 206.

As shown in the collinear chart of FIG. 11, in the transfer 200, the input/output rotary element REIO is selectively connected to the TF input shaft 204 via the first dog clutch D1 that is placed in the first state [1], and is connected to the rear propeller shaft 32. The first power source PU1 including the engine 12 is connected to the TF input shaft 204 via the hybrid transmission 26 in a power transmittable manner. Further, in the differential device 206, the first rotary element RET is connected to the TF rotary electric machine MGF in a power transmittable manner, and is selectively connected to the TF input shaft 204 via the first dog clutch D1 that is placed in the second state [2]. The second rotary element RE2 is connected to the first output shaft 208, i.e., the rear propeller shaft 32, and is selectively selected to the second output shaft 214, i.e., the front propeller shaft 30, via the second dog clutch D2 that is placed in the third state [3]. The third rotary element RE3 is selectively connected to the second output shaft 214 via the second dog clutch D2 that is placed in the third state [2], and is selectively connected to the transfer case 202 via the TF brake BF1. Moreover, the first and second rotary elements RET, RE2 are selectively connected to each other via the TF clutch CF1. In the collinear chart of FIG. 11, the relationship among the rotational speeds of the respective first, second and third rotary elements RE1, RE2, RE3 in the differential device 206 is represented by a straight line Lcd. The first output shaft 208 is an output shaft to which the power of the first power source PUT is to be inputted via the torque converter 48 and from which is the power is to be outputted to the rear wheels 16. That is, the first output shaft 208 is an output shaft from which the power, inputted through the first power transmission path PT1 from the turbine impeller 48b of the torque converter 48, is to be outputted to the rear wheels 16. The second output shaft 214 is an output shaft from which the power is to be outputted to the front wheels 14.

The transfer 202 includes a speed change device 224 (see FIG. 10) including the TF clutch CF1, the TF brake BF1 and the differential device 206 that constitutes a part of the transfer 200.

The speed change device 224 serves as a second transmission device configured to change a speed of rotation of the TF rotary electric machine MGF and to output the rotation whose speed has been changed. That is, the speed change device 224 serves as a TF transmission configured to establish a selected one of a high-speed gear position and a low-speed gear position, wherein the high-speed gear position is established with the TF clutch CF1 being placed in the engaged state, and the low-speed gear position is established with the TF brake BFT being placed in the engaged state. From another point of view, the speed change device 224 constitutes a part of the second power transmission path PT2 that is different from the first power transmission path PT1. That is, the second power transmission path PT2 is provided with the speed change device 224.

Further, the differential device 206 serves as a center differential. In this instance, with the first dog clutch D1 being in the first state [1] and with the second dog clutch D2 being in the second state [2] in the transfer 200, the differential device 206 can cause the torque of the first power source PU1 inputted to the second rotary element RE2, to be distributed to the third rotary element RE3, owing a reaction torque of the TF rotary electric machine MGF connected to the first rotary element RE1. Further, the differential device 206 can cause the torque of the first power source PU1 inputted to the second rotary element RE2, to be distributed to the third rotary element RE3, also by limiting the differential effect of the differential device 206 by placing the TF clutch CF1 in a slipping state, in place of applying the reaction torque of the TF rotary electric machine MGF. Thus, the transfer 200 is a torque distribution device configured to distribute a part of the torque inputted to the first output shaft 208, to the second output shaft 214, for thereby making it possible to distribute the torque between the front wheels 14 and the rear wheels 16. It is noted that, in the transfer 200, when the second dog clutch D2 is in the third state [3], the differential device 206 is placed in a differential lock state in which the differential device 206 does not function as the center differential.

FIG. 12 is a table indicating a relationship between each mode established in the transfer 200 and controlled states of respective the engagement devices in the transfer 200. In FIG. 12, "○" in columns of the TF brake BF1 and the TF clutch CF1 indicates that the TF brake BF1 or TF clutch CF1 is in its engaged state, and blank in the columns of the TF brake BF1 and the TF clutch CF1 indicates that the TF brake BF1 or TF clutch CF1 is in its released state. Further, in FIG. 12, "○" in columns of the first and second dog clutches D1, D2 indicates that the first dog clutch D1 or second dog clutch D2 is placed in the corresponding state, and "(○)" in the column of the first dog clutch D1 indicates that the first dog clutch D1 may be placed in its released state where the first dog clutch D1 can be placed in the released state. The table of FIG. 12 is different from the table of FIG. 6 in that the "EV (FF) HIGH" mode is replaced by "EV (FR) HIGH" mode in number m1 and the "EV (FF) LOW" mode is replaced by "EV (FR) LOW" mode in number m2. The differences of FIG. 12 from FIG. 6 will be described.

Each of the "EV (FR) HIGH" mode of number m1 and the "EV (FF) LOW" mode of number m2 is the TrEV mode. In the "EV (FR) HIGH" mode and the "EV (FR) LOW" mode, with the second dog clutch D2 being placed in the first state [1], the neutral state (see "N" in FIG. 12) is established with any one of the fourth, fifth and sixth dog teeth a4, a5, a6 being not connected to the others of the fourth, fifth and sixth dog teeth a4, a5, a6, so that a power transmission path between the differential device 206 and the front wheels 14 is cut off. In this state in which the second dog clutch D2 being placed in the first state [1], the power of the TF rotary electric machine MGF is transmitted toward the rear wheels 16 in the speed change device 224 in which the high-speed gear position is established with the TF clutch CF1 being in the engaged state or the low-speed gear position is established with the TF brake BF1 being in the engaged state. Thus, in the present embodiment, the BEV running is performed by a rear-wheel drive running. In the TrEV mode, it is possible to avoid drag of the engine 12, for example, with the automatic transmission 50 being placed in the neutral state when the first dog clutch D1 is in the first state [1]. Where the first dog clutch D1 can be placed in the released state, it is possible to avoid drag of the engine 12 and drag of the automatic transmission 50, with the first dog clutch D1 being placed in the released state, even without the automatic transmission 50 being placed in the neutral state. Further, in the TrEV mode that is the "EV (FR) HIGH" mode or "EV (FR) LOW" mode, the power of the first power source PUT can be transmitted to the rear wheels 16, with the first power transmission path PT1 being placed in the power transmittable state, so that it is possible to perform an engine running, i.e., an HEV running. In this engine running, for example, a rear-wheel drive running by a parallel hybrid running or a rear-wheel drive running by only the power of the first power source PUT can be performed.

"H4_TORQUE SPLIT" mode of number m3 is a mode for distributing the torque between the front wheels 14 and the rear wheels 16 at a desired ratio that is dependent on the reaction torque of the TF rotary electric machine MGF, for example, with the torque of the first power source PUT transmitted from the first output shaft 208 to the differential device 206 being held by the sun gear S to which the reaction torque of the TF rotary electric machine MGF is applied, and with the speed change device 224 being placed in a state corresponding to the high-speed gear position. In the "H4_TORQUE SPLIT" mode established in the transfer 200, the TF rotary electric machine MGF is caused to regenerate the electric power, with which the battery 24 is charged, for example.

"H4_LSD" mode of number m4 is a mode for distributing the torque between the front wheels 14 and the rear wheels 16 at a desired ratio that is dependent on the torque capacity of the TF clutch CF1, by limiting the differential effect of the differential device 206 by placing the TF clutch CFT in the slipping state, in place of applying the reaction torque of the TF rotary electric machine MGF in the "H4_TORQUE SPLIT" mode.

"H4_Lock" mode of number m5 is a mode for distributing the torque of the first power source PUT transmitted to the first output shaft 208, between the front wheels 14 and the rear wheels 16, with the differential device 206 being placed in the differential lock state.

"L4_Lock" mode of number m6 is a mode for distributing the torque of the first power source PU1 transmitted to the sun gear S of the differential device 206, between the front wheels 14 and the rear wheels 16, with the differential device 206 being placed in the differential lock state and with the speed change device 224 being placed in the low-speed gear position.

The present second embodiment provides substantially the same effects as in the above-described first embodiment.

Third Embodiment

Figure 13:
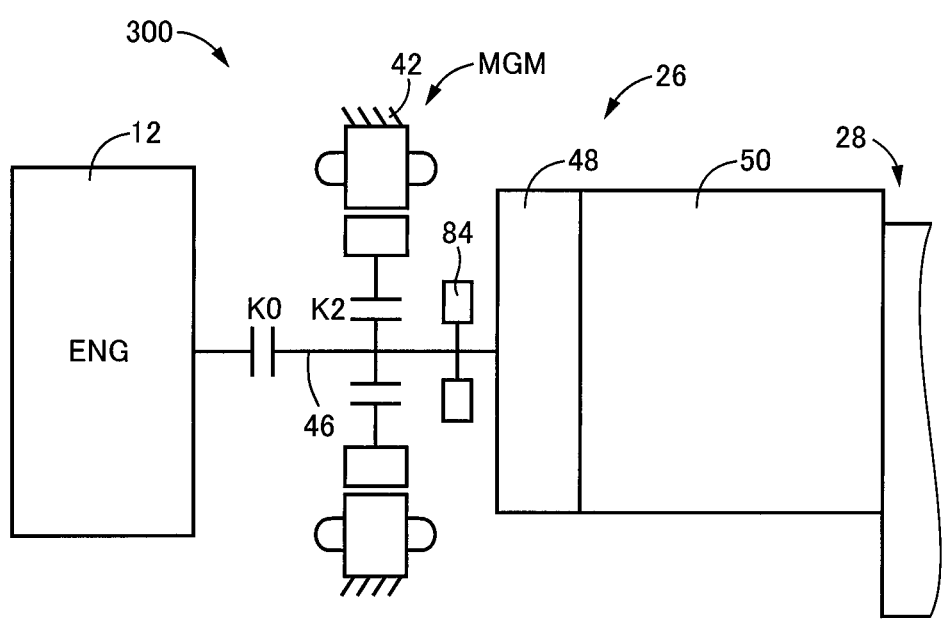
FIG. 13 is a view schematically showing a construction of a power transmission device that is other than a power transmission device shown in FIG. 1.

FIG. 13 is a view schematically showing a construction of a power transmission device 300 that is other than the power transmission device 18 shown in FIG. 1. As shown in FIG. 13, the power transmission device 300 is different from the power transmission device 18 mainly in that an engine connecting/disconnecting clutch K0 and a rotary-electric-machine connecting/disconnecting clutch K2 are provided.

Specifically, the power transmission device 300 includes the engine connecting/disconnecting clutch K0 and the rotary-electric-machine connecting/disconnecting clutch K2 that are provided in the transmission case 42. The engine connecting/disconnecting clutch K0 is a clutch configured to connect and disconnect between the connection shaft 46 and the engine 12. The rotary-electric-machine connecting/disconnecting clutch K2 is a clutch configured to connect and disconnect between the connection shaft 46 and the TM rotary electric machine MGM.

In the TrEV mode such as the "EV (FF) HIGH" mode, "EV (FF) LOW" mode (that are shown in FIG. 6) and the "EV (FR) HIGH" mode, "EV (FR) LOW" mode (that are shown in FIG. 12), it is possible to avoid drag of the engine 12, for example, with the engine connecting/disconnecting clutch K0 being placed in the released state when the first dog clutch D1 is in the first state [1]. In this instance, with the TM rotary electric machine MGM being caused to perform a power driving, without the TM rotary electric machine MGM being idled, it is possible to perform a BEV running using the powers of the two rotary electric machines, i.e., the TM rotary electric machine MGM and the TF rotary electric machine MGF. Further, in the TrEV mode, it is possible to avoid drag of the TM rotary electric machine MGM, for example, with the rotary-electric-machine connecting/disconnecting clutch K2 being placed in the released state, without the TM rotary electric machine MGM being controlled to be idled.

The engine connecting/disconnecting clutch K0 and the rotary-electric-machine connecting/disconnecting clutch K2 may be provided also in the above-described first embodiment, so that the torque assisting control can be executed by operating the TM rotary electric machine MGM without operating the engine 12, with the rotary-electric-machine connecting/disconnecting clutch K2 being placed in the engaged state and with the engine connecting/disconnecting clutch K0 being placed in the released state.

The present third embodiment provides substantially the same effects as in the above-described first embodiment.

While the preferred embodiments of this invention have been described in detail by reference to the drawings, it is to be understood that the invention may be otherwise embodied.

For example, when the MGF temperature THmgf is high, the equipment such as the TF rotary electric machine MGF could be overheated. Therefore, in the above-described embodiments, when the vehicle 8 is stopped or running at the extremely low speed not higher than the threshold speed value Vf, with the BEV driving mode being established as the driving mode, the electronic control device 130 may be configured, upon determination that the MGF temperature THmgf is not lower than a threshold temperature value THf, to place the lockup clutch LU into the engaged state and to place the first power transmission path PT1 into the power transmittable state. That is, in this modified arrangement, the torque converter 48 is placed in the lockup state and the automatic transmission 50 is placed in the AT1-speed gear position, in a case in which it is determined that the MGF temperature THmgf is not lower than the threshold temperature value THf, even when it is not determined that the drive request amount DEM is larger than the threshold amount value DEMf. The threshold temperature value THf is a predetermined threshold value for determining, when the MGF temperature THmgf is not lower than the threshold temperature value THf, that it is better to prepare for suppressing overheating of the equipment such as the TF rotary electric machine MGF, for example. Further, the preparation for suppressing overheating of the equipment such as the TF rotary electric machine MGF may be made at an earlier timing as the MGF temperature THmgf is higher, so that, in a case in which the equipment such as the TF rotary electric machine MGF could be easily overheated, it is possible to place each of the lockup clutch LU and the automatic transmission 50 in advance in a prepared state for suppressing overheating of the equipment such as the TF rotary electric machine MGF, i.e., a state in which the power can be immediately outputted to the first output shaft 66 once the power is outputted from the first power source PUT.

For example, when the vehicle 8 is on an uphill road having a large gradient, the equipment such as the TF rotary electric machine MGF could be overheated. Therefore, when the vehicle 8 is stopped or running at the extremely low speed not higher than the threshold speed value Vf, with the BEV driving mode being established as the driving mode, the electronic control device 130 may be configured, upon determination that the vehicle 8 is on an uphill road having a gradient not smaller than a threshold gradient value, to place the lockup clutch LU into the engaged state and to place the first power transmission path PT1 into the power transmittable state. That is, in this modified arrangement, the torque converter 48 is placed in the lockup state and the automatic transmission 50 is placed in the AT1-speed gear position, in a case in which it is determined that the vehicle 8 is on the uphill road having the gradient not smaller than the threshold gradient value, even when it is not determined that the drive request amount DEM is larger than the threshold amount value DEMf. The gradient of the uphill road, on which the vehicle 8 is, may be detected, for example, based on the longitudinal acceleration Gx or by a gradient sensor (not shown). The threshold gradient value is a predetermined threshold value for determining, when the vehicle 8 is on the uphill road having the gradient not smaller than the threshold gradient value, that it is better to prepare for suppressing overheating of the equipment such as the TF rotary electric machine MGF, for example. Further, the preparation for suppressing overheating of the equipment such as the TF rotary electric machine MGF may be made at an earlier timing as the gradient of the uphill road is larger, so that, in a case in which the equipment such as the TF rotary electric machine MGF could be easily overheated, it is possible to place each of the lockup clutch LU and the automatic transmission 50 in advance in the prepared state for suppressing overheating of the equipment such as the TF rotary electric machine MGF.

For example, when the vehicle weight WTv is large, the equipment such as the TF rotary electric machine MGF could be overheated. Therefore, when the vehicle 8 is stopped or running at the extremely low speed not higher than the threshold speed value Vf, with the BEV driving mode being established as the driving mode, the electronic control device 130 may be configured, upon determination that the vehicle weight WTv is larger than a threshold weight value WTvf, to place the lockup clutch LU into the engaged state and to place the first power transmission path PT1 into the power transmittable state. That is, in this modified arrangement, the torque converter 48 is placed in the lockup state and the automatic transmission 50 is placed in the AT1-speed gear position, in a case in which it is determined that the vehicle weight WTv is larger than the threshold weight value WTvf, even when it is not determined that the drive request amount DEM is larger than the threshold amount value DEMf. The threshold weight value WTvf is a predetermined threshold value for determining, when the vehicle weight WTv is larger than the threshold weight value WTvf, that it is better to prepare for suppressing overheating of the equipment such as the TF rotary electric machine MGF, for example. Further, the preparation for suppressing overheating of the equipment such as the TF rotary electric machine MGF may be made at an earlier timing as the vehicle weight WTv is larger, so that, in a case in which the equipment such as the TF rotary electric machine MGF could be easily overheated, it is possible to place each of the lockup clutch LU and the automatic transmission 50 in advance in the prepared state for suppressing overheating of the equipment such as the TF rotary electric machine MGF.

For example, in the above-described first and second embodiments, each of the speed change devices 83, 224 may be a transmission configured to establish three or more gear positions, or may be a continuously-variable transmission, too.

Further, in the above-described first and second embodiments, the TF clutch CF1 may be also a clutch configured to selectively connect between the first and third rotary elements RE1, RE3 of the differential device (64; 206), or may be also a clutch configured to selectively connect between the second and third rotary elements RE2, RE3 of the differential device (64; 206). That is, the TF clutch CF1 may be configured to selectively connect between any two of the first, second and third rotary elements RE1, RE2, RE3.

Further, in the above-described first and second embodiments, the vehicle driving apparatus 10 may be modified such that the first output shaft (66; 208) is constituted by an output shaft from which the power, inputted through the first power transmission path PT1 from the turbine impeller 48b of the torque converter 48, is to be outputted to the front wheels 14, and such that the second output shaft (72; 214) is constituted by an output shaft from which the power is to be outputted to the rear wheels 16.

Further, in the above-described third embodiment, the power transmission device 300 includes both of the engine connecting/disconnecting clutch K0 and the rotary-electric-machine connecting/disconnecting clutch K2. However, the power transmission device 300 does not necessarily have to include both of the clutches K0, K2. For example, from a viewpoint that it is enough as long as the engine 12 can be disconnected from the drive train, the power transmission device 300 does not necessarily have to include the rotary-electric-machine connecting/disconnecting clutch K2, as long as the power transmission device 300 includes at least the engine connecting/disconnecting clutch K0.

Further, in the above-described embodiments, the automatic transmission 50 may be also a known belt-type continuously variable transmission or a synchronous mesh twin shaft parallel axis-type automatic transmission including a known DCT (Dual Clutch Transmission), for example.

Further, in the above-described embodiments, the fluid transmission device may be constituted by the torque converter 48. However, the fluid transmission device may be constituted by other fluid transmission device such as a fluid coupling device without a function of torque boost effect, in place of the torque converter 48.

It is to be understood that the embodiments described above are given for illustrative purpose only, and that the present invention may be embodied with various modifications and improvements which may occur to those skilled in the art.

NOMENCLATURE OF ELEMENTS

8: vehicle
10: vehicle driving apparatus
14: front wheel
16: rear wheel
28: transfer (torque distribution device)
44: transfer case (non-rotary member)

48: torque converter (fluid transmission device)
48a: pump impeller (input-side rotary element)
48b: turbine impeller (output-side rotary element)
50: automatic transmission
64: differential device
S: sun gear (first rotary element)
CA: carrier (second rotary element)
R: ring gear (third rotary element)
66: first output shaft (another rotary element)
72: second output shaft
83: speed change device
130: electronic control device (control device)
200: transfer (torque distribution device)
202: transfer case (non-rotary member)
206: differential device
S: sun gear (first rotary element)
CA: carrier (second rotary element)
R: ring gear (third rotary element)
208: first output shaft (another rotary element)
214: second output shaft
224: speed change device
BF1: TF brake (second engagement device)
CF1: TF clutch (first engagement device)
D2: second dog clutch (connecting/disconnecting device)
DW: drive wheels
LU: lockup clutch (direct clutch)
MGF: TF rotary electric machine (rotary electric machine)
PT1: first power transmission path
PT2: second power transmission path
PU1: first power source
PU2: second power source

What is claimed is:

1. A driving apparatus for a vehicle that includes a pair of front wheels and a pair of rear wheels, the driving apparatus comprising:
    a first power source;
    a fluid transmission device including an input-side rotary element connected to the first power source in a power transmittable manner, an output-side rotary element connected to the pair of front wheels and the pair of rear wheels in a power transmittable manner, and a direct clutch configured to connect and disconnect between the input-side rotary element and the output-side rotary element, the fluid transmission device being configured to transmit a power of the first power source from the input-side rotary element to the output-side rotary element through a fluid;
    a first output shaft which is configured to receive the power transmitted from the output-side rotary element of the fluid transmission device through a first power transmission path and which is configured to output the power to one of the pair of front wheels and the pair of rear wheels;
    a rotary electric machine connected, in a power transmittable manner, to the first output shaft and/or the other of the pair of front wheels and the pair of rear wheels, through a second power transmission path that is other than the first power transmission path; and
    a control device configured to establish, as a driving mode for driving the vehicle, a rotary-electric-machine driving mode using the rotary electric machine as a second power source, in a state in which an operation of the first power source is stopped,
    wherein, when the vehicle is stopped or running at an extremely low speed not higher than a threshold speed value, with the rotary-electric-machine driving mode being established as the driving mode, the control device is configured, upon determination that a drive request amount requested to the vehicle is larger than a threshold amount value, to place the direct clutch into an engaged state and to place the first power transmission path into a power transmittable state so as to cause the power of the first power source to be outputted to the first output shaft.

2. The driving apparatus according to claim 1,
    wherein, when the vehicle is stopped or running at the extremely low speed not higher than the threshold speed value, with the rotary-electric-machine driving mode being established as the driving mode, the control device is configured, upon determination that a temperature of the rotary electric machine is not lower than a threshold temperature value, to place the direct clutch into the engaged state and to place the first power transmission path into the power transmittable state.

3. The driving apparatus according to claim 1,
    wherein the second power transmission path is provided with a speed change device that is configured to change a speed of rotation of the rotary electric machine in accordance with a gear ratio and to output the rotation whose speed has been changed, and
    wherein the control device is configured to control the gear ratio of the speed change device, depending on the drive request amount, such that the gear ratio is higher when the drive request amount is larger than the threshold amount value, than when the drive request amount is not larger than the threshold amount value.

4. The driving apparatus according to claim 3, further comprising a second output shaft configured to output the power to the other of the pair of front wheels and the pair of rear wheels,
    wherein the speed change device includes:
        a differential device including a first rotary element connected to the rotary electric machine, a second rotary element connected to one of the first and second output shafts and a third rotary element connected to the other of the first and second output shafts, the differential device constituting a part of a torque distribution device that is configured to distribute a part of a torque inputted to the first output shaft, to the second output shaft;
        a first engagement device configured to connect and disconnect between two of the first, second and third rotary elements; and
        a second engagement device configured to connect and disconnect between the third rotary element and a non-rotary member.

5. The driving apparatus according to claim 4,
    wherein the torque distribution device includes a connecting/disconnecting device that is to be placed in a selected one of (i) a first connection state in which the other of the first and second output shafts is connected to the third rotary element, (ii) a second connection state in which the other of the first and second output shafts is connected to the one of the first and second output shafts, and (iii) a disconnection state in which the other of the first and second output shafts is disconnected from the third rotary element and the one of the first and second output shafts, and
    wherein the control device is configured to place the connecting/disconnecting device in the disconnection state, when the vehicle is running with deceleration with the rotary-electric-machine driving mode being established as the driving mode.

6. The driving apparatus according to claim 4,
wherein the first output shaft is another rotary element which is other than the first, second and third rotary elements of the differential device and which is configured to receive the power of the first power source.

7. The driving apparatus according to claim 1,
wherein, when the vehicle is stopped or running at the extremely low speed not higher than the threshold speed value, with the rotary-electric-machine driving mode being established as the driving mode, the control device is configured, upon determination that the vehicle is on an uphill road having a gradient not smaller than a threshold gradient value, to place the direct clutch into the engaged state and to place the first power transmission path into the power transmittable state.

8. The driving apparatus according to claim 1,
wherein, when the vehicle is stopped or running at the extremely low speed not higher than the threshold speed value, with the rotary-electric-machine driving mode being established as the driving mode, the control device is configured, upon determination that the vehicle has a weight not smaller than a threshold weight value, to place the direct clutch into the engaged state and to place the first power transmission path into the power transmittable state.

* * * * *